US011647156B2

(12) United States Patent
Garg et al.

(10) Patent No.: US 11,647,156 B2
(45) Date of Patent: *May 9, 2023

(54) DYNAMICALLY MODIFYING LIVE VIDEO STREAMS FOR PARTICIPANT DEVICES IN DIGITAL VIDEO ROOMS

(71) Applicant: Meta Platforms, Inc., Menlo Park, CA (US)

(72) Inventors: Vivek Garg, Seattle, WA (US); Mudit Goel, Sammamish, WA (US); Paul Seia Ogawa, Seattle, WA (US); Eduardo Diaz Real, Bellevue, WA (US); Joel Alexander Sharin, Seattle, WA (US); Keetaek Hong, Seattle, WA (US); Ross Legacy, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,542

(22) Filed: Dec. 13, 2021

(65) Prior Publication Data

US 2022/0103788 A1 Mar. 31, 2022

Related U.S. Application Data

(63) Continuation of application No. 17/196,704, filed on Mar. 9, 2021, now Pat. No. 11,202,035.

(Continued)

(51) Int. Cl.
 *H04N 7/15* (2006.01)
(52) U.S. Cl.
 CPC .................. *H04N 7/152* (2013.01)

(58) Field of Classification Search
 CPC ......... H04N 7/15; H04N 7/152; H04N 7/147; H04L 65/403

(Continued)

(56) References Cited

U.S. PATENT DOCUMENTS

| 8,693,648 B1 | 4/2014 | Drugge et al. |
| 8,789,094 B1 | 7/2014 | Singh et al. |

(Continued)

FOREIGN PATENT DOCUMENTS

| WO | WO-2009154596 A1 | 12/2009 |
| WO | WO-2018175989 A1 | 9/2018 |

OTHER PUBLICATIONS

Extended European Search Report for European Application No. 21169468.2, dated Sep. 16, 2021, 8 pages.

*Primary Examiner* — Melur Ramakrishnaiah
(74) *Attorney, Agent, or Firm* — Keller Preece PLLC

(57) ABSTRACT

This disclosure describes a video room system that can efficiently and flexibly generate and facilitate video rooms for video chatting between participant devices by prioritizing video streams to provide to participant devices based on performance parameters. For example, the video room system can provide different video room streams to different participant devices based on the performance parameters of the participant devices. In addition, the video room system can customize or tailor video room streams based on identifying dominant speaker devices, determining connections between participant devices as indicated by a social graph of a social networking system, and/or based on join methods utilized by participant devices to join a video room.

20 Claims, 14 Drawing Sheets

Related U.S. Application Data

(60) Provisional application No. 63/014,931, filed on Apr. 24, 2020.

(58) Field of Classification Search
USPC .......................................... 348/14.01–14.16
See application file for complete search history.

(56) References Cited

U.S. PATENT DOCUMENTS

| | | |
|---|---|---|
| 9,001,178 B1 | 4/2015 | Leske et al. |
| 9,325,853 B1 | 4/2016 | Marinov |
| 9,712,570 B1 * | 7/2017 | Ivov .................... H04L 65/765 |
| 10,999,346 B1 | 5/2021 | Yang |
| 2009/0213206 A1 | 8/2009 | Niu et al. |
| 2009/0249413 A1 | 10/2009 | Karaoguz et al. |
| 2012/0262537 A1 | 10/2012 | Baker et al. |
| 2012/0300015 A1 | 11/2012 | Chen et al. |
| 2013/0208080 A1 | 8/2013 | Lukasik et al. |
| 2013/0215215 A1 | 8/2013 | Gage et al. |
| 2013/0263021 A1 | 10/2013 | Dunn et al. |
| 2014/0114664 A1 | 4/2014 | Khan et al. |
| 2014/0173430 A1 | 6/2014 | Clavel et al. |
| 2015/0085057 A1 | 3/2015 | Ouyang et al. |
| 2015/0248918 A1 | 9/2015 | Tang |
| 2015/0350604 A1 | 12/2015 | Roy et al. |
| 2016/0323330 A1 * | 11/2016 | Holst ................. H04L 12/1822 |
| 2017/0076713 A1 | 3/2017 | Gildein, II et al. |
| 2017/0201715 A1 | 7/2017 | Tobita |
| 2018/0013982 A1 * | 1/2018 | Mann ................. H04L 65/1093 |
| 2018/0152486 A1 | 5/2018 | Singh et al. |
| 2018/0191792 A1 | 7/2018 | Paul |
| 2020/0024599 A1 | 1/2020 | Aronin et al. |
| 2020/0218773 A1 * | 7/2020 | Bejjanki .......... G06K 19/06028 |

* cited by examiner

DYNAMICALLY MODIFYING LIVE VIDEO STREAMS FOR PARTICIPANT DEVICES IN DIGITAL VIDEO ROOMS

CROSS-REFERENCE TO RELATED APPLICATIONS

This application is a continuation of U.S. patent application Ser. No. 17/196,704, filed on Mar. 9, 2021, which claims the benefit of and priority to provisional Application No. 63/014,931, filed on Apr. 24, 2020. Each of the aforementioned applications is hereby incorporated by reference in its entirety.

BACKGROUND

Advancements in software and hardware platforms have led to a variety of improvements in systems that connect client devices across networks. For example, digital communication systems are now able to facilitate video calls between client devices for face-to-face communication over long distances. Some digital communication systems have even developed that enable access by groups of two or more client devices of different types (e.g., mobile and desktop) to connect within a common video conference.

Despite these advances however, conventional digital communication systems continue to suffer from a number of disadvantages, particularly in their efficiency and flexibility. In particular, many conventional digital communication systems inefficiently utilize or consume computing resources of client devices participating in video chats. For example, some conventional systems require an excessive amount of processing power, memory, and battery life on the part of client devices to process and display video feeds or streams from other client devices within the video chat. Indeed, conventional systems often distribute video streams across client devices within a common video chat, which grows more taxing on the processors, batteries, and network bandwidths of the client devices as the number of devices in the video chat grows larger.

In addition to being inefficient, some conventional digital communication systems are also inflexible. For instance, some conventional systems rigidly provide a uniform experience for all client devices within a common video chat. As mentioned above, this approach not only places an overwhelming burden on client devices and transmission networks, but this inflexible uniformity can also result in a degraded user experience. Due to the rigid nature of many conventional systems in providing video streams to client devices, these conventional systems prevent many client devices from presenting clear, effective video chat interfaces.

Thus, there are disadvantages with regard to conventional digital communication systems.

SUMMARY

One or more embodiments described herein provide benefits and solve one or more of the foregoing or other problems in the art with systems, methods, and non-transitory computer readable media that can efficiently and flexibly generate and facilitate digital video rooms between participant devices by prioritizing video streams based on performance parameters. More specifically, the disclosed systems can generate a video room and can facilitate video chatting between participant devices within the video room. Further, the disclosed systems can determine performance parameters associated with participant devices participating in the video room and can modify video room streams based on respective performance parameters of the participant devices. For example, the disclosed systems can provide video room streams to a participant device by selecting a subset of live video streams received from other participant devices to provide to the participant device. By providing a subset of live video streams to a participant device based on performance parameters of the participant device, the disclosed systems can efficiently and flexibly facilitate video chatting within a video room.

Additional features and advantages of the present application will be set forth in the description which follows, and in part will be obvious from the description, or may be learned by the practice of such example embodiments.

BRIEF DESCRIPTION OF THE DRAWINGS

The detailed description refers to the drawings briefly described below.

DETAILED DESCRIPTION

Figure 1:
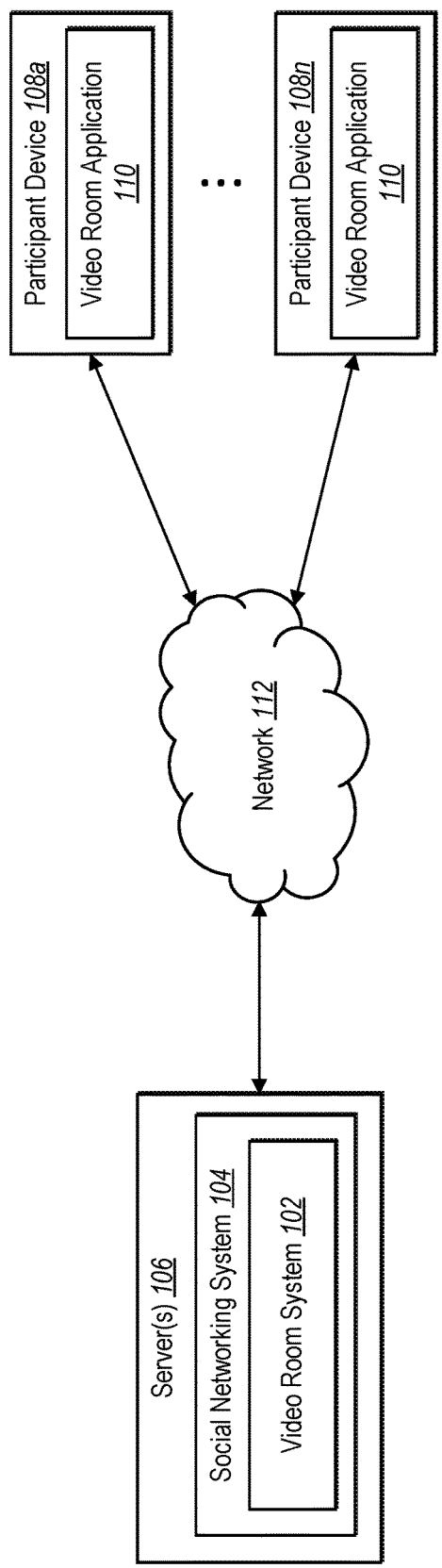
FIG. 1 illustrates a block diagram of an environment for implementing a video room system in accordance with one or more embodiments.

One or more embodiments described herein provide benefits and solve one or more of the foregoing or other problems in the art with a video room system that can efficiently and flexibly generate and facilitate video rooms between participant devices by prioritizing video streams to provide to participant devices based on performance parameters. As part of facilitating video chatting between participant devices participating in a video room, the video room system can provide different video room streams to different participant devices based on the performance parameters of the participant devices. For example, the video room system can provide a first subset of live video streams to include within a first video room stream for a first participant device and can provide a second subset of live video streams to include within a second video room stream for a second participant device. The video room system can determine performance parameters associated with the first participant device and the second participant device which can indicate how many (and/or which specific) live video streams to include within the respective video room streams. In addition to performance parameters, the video room system can customize or tailor video room streams based on identifying dominant speaker devices, determining connections between participant devices as indicated by a social graph of a social networking system, and/or based on join methods utilized by participant devices to join a video room.

As mentioned, the video room system can generate and facilitate a digital video room for video chatting between participant devices. In particular, the video room system can receive an indication from a participant device (e.g., a creator device) to generate a digital or virtual space for participant devices to communicate by receiving and providing video and audio information amongst other participant devices in the video room. In some embodiments, the video room system maintains a video room for a particular period of time, leaving it open for come-and-go access by participant devices with or without the creator device being present.

As part of facilitating a video room, the video room system can provide video room streams to participant devices participating in the video room. More specifically, the video room system can provide video room streams that include one or more live video streams received from other participant devices in the video room. For example, the video room system can receive live video streams from all participant devices in the video room and can select particular (and/or a number of) live video streams to provide to each participant device based on performance parameters (or other factors) associated with the participant devices. Thus, the video room system can provide different video room streams to different participant devices in the same video room.

To elaborate, the video room system can provide a first subset of live video streams to a first participant device and can provide a second subset of live video streams to a second participant device within the same video room. In addition, the video room system can determine performance parameters for the first participant device and the second participant device. Based on the performance parameters, the video room system can modify the first subset of live video streams and modify the second subset of live video streams to provide video room streams in accordance with the performance of the first participant device and the second participant device.

As mentioned, the video room system can determine performance parameters of participant devices. In particular, the video room system can determine performance parameters that indicate how many live video streams a particular participant device can decode and/or display at a given time. For example, the video room system can determine performance parameters such as processing capacity, bandwidth, battery life, screen size, and/or an access platform by which the participant device is accessing the video room.

In some embodiments, the video room system monitors performance parameters to identify or detect changes in performance parameters over time. For instance, the video room system can identify changes to battery life of a participant device over time. As another example, the video room system can monitor changes to network bandwidth of a participant device over time. Based on monitoring the performance parameters, the video room system can dynamically modify video room streams provided to participant devices. Specifically, the video room system can add or remove live video streams to provide to participant devices based on performance parameters to maintain at least a threshold video chat quality (e.g., audio quality, framerate, and/or resolution) and/or to maintain less than a threshold consumption of participant device resources.

In addition to modifying based on performance parameters, the video room system can dynamically modify live video streams provided as part of a video room stream based on other factors as well. For example, the video room system can determine join methods by which participant devices accessed a video room. In some embodiments, the video room system modifies a video room stream for a participant device that accessed the video room via a shared video room invite to include additional live video streams. In these or other embodiments, the video room system modifies a video room stream for a participant device that accessed the video room via a video room option that was automatically surfaced to the participant device (e.g., within a social networking feed) to include fewer live video streams.

Further, the video room system can determine connections between participant devices (or between user accounts associated with the participant devices) as indicated by nodes and edges of a social graph. Particularly, the video room system can determine a closeness of a connection between two or more participant devices (or between respective user accounts of users operating the participant devices). Based on the closeness of the connection between the participant devices, the video room system can modify the video room stream provided to the participant devices to include more or fewer live video streams. For example, the video room system can determine a connection between a joining participant device and a creator participant device (and/or other participant devices within the video room) to determine how many and/or which specific live video streams to provide to the joining participant device. In some embodiments, the video room system provides more live video streams to participant devices with closer connections than participant devices with farther connections.

In addition (or alternatively) to determining connections between participant devices, the video room system can modify video room streams based on determining dominant speaker devices. In particular, the video room system can determine one or more dominant speaker devices within a video room by monitoring audio output received from the participant devices within the video room. For instance, the video room system can identify a dominant speaker device from among a plurality of participant devices within a video room as a participant device from which the video room system receives audio data that meets or exceeds a threshold volume amplitude sustained over a period of time (e.g., the most recent 3 seconds, the most recent 5 seconds, the most recent 30 seconds, or the duration of the video room). In some embodiments, the video room system discerns between garbage audio or noise and verbal or other meaningful audio, and the video room system filters out noise to only consider meaningful audio in the determination of dominant speaker devices. Additional detail regarding determining dominant speaker devices is provided below with reference to the figures.

As suggested above, the video room system can provide several advantages over conventional digital communication systems. In particular, the video room system can improve efficiency over conventional digital communication systems. While may conventional systems inefficiently utilize computing resources of client devices by distributing video streams uniformly across all client devices within a video chat, the video room system can require fewer computing resources (e.g., processing power, memory, and battery life) on the part of participant devices (and server devices) within a video room by selectively providing subsets of live video streams to participant devices. Indeed, the video room system can achieve this improved efficiency by providing live video streams to participant devices based on performance parameters of the participant devices as well as connections between participant devices and/or join methods by which the participant devices access the video room. The efficiency improvements of the video room system are especially pronounced for video rooms with large numbers (e.g., 50) of participant devices, where the video room system's selective providing of live video streams exhibits marked improvement in performance over the more taxing, less selective stream handling and decoding methods of conventional systems.

In addition to improving efficiency, the video room system can also improve flexibility over conventional digital communication systems. As opposed to many conventional systems that provide a uniform experience for all client devices, regardless of device capabilities (or other factors), the video room system can provide different subsets of live video streams to different participant devices within a common video room to customize video room streams for each participant device. Thus, the video room system provides video room streams that are not only less taxing on participant devices but that are also tailored for each participant device for a smooth, satisfying user experience. Not only are the video room streams tailored for each participant device, but the video room system provides additional improved flexibility over conventional systems by dynamically modifying video room streams provided to participant devices (e.g., as performance parameters change over time).

As indicated by the foregoing discussion, the present disclosure utilizes a variety of terms to describe features and advantages of the video room system. For example, as used herein, the term "video room" refers to a digital or virtual space for participant devices to connect for transmission of audio and video information as part of a video chat. In some embodiments, a video room includes a unique uniform resource locator ("URL") within the Internet that designates the digital space accessible by participant devices. A video room can facilitate video chatting between a threshold number (e.g., 50 or 100) of participant devices. A video room can remain open for a threshold period of time (without video room activity) or until a moderator device disables and/or locks the video room. Rather than being tied to the timeframe of a meeting or some other event, a video room can remain open for several days, weeks, or months, thereby allowing participant devices to come and go to and from the video room for impromptu interactions amongst them.

As mentioned, the video room system can generate and provide a video room stream to a participant device within a video room. As used here, the term "video room stream" refers to a presentation of two or more live video streams together in a single interface (e.g., where the live video streams are captured by separate participant devices engaged in a video chat within a video room). For example, a video room stream can include a presentation of a first live video stream captured by a first participant device and a second live video stream captured by a second participant device. Relatedly, the term "live video stream" refers to audio and/or video data captured by a participant device and distributed to other participant devices within a video room. For example, each participant device can capture and provide a respective live video stream.

As mentioned, the video room system can modify a video room stream based on performance parameters associated with a participant device. As used herein, the term "performance parameter" refers to a parameter, a characteristic, or a metric that indicates or represents a performance capacity, a capability, or a functionality of a participant device. For example, a performance parameter can include a remaining battery life, a total battery capacity, a processing capacity, a bandwidth (e.g., a network capacity), or an access platform. The term "access platform" refers to an application or a software platform utilized by a participant device to access a video room. In particular, a participant device utilizes an access platform to access and display a video room including a video room stream including one or more live video streams. An access platform can include a mobile application, a mobile browser, a desktop application, a desktop browser, or some other software application.

As mentioned, the video room system can customize or modify a video room stream based on a join method associated with a participant device. As used herein, the term "join method" refers to user selection of an access point or an entry point that a participant device utilizes to gain access to a video room. For example, a join method can include a selection of a video room invite (e.g., a link for a video room URL) shared by a creator device (or some other participant device with permission to access the video room) and/or can include a selection of a video room option automatically surfaced within a social networking feed. Indeed, the video room system can automatically surface a video room option within a social networking feed displayed on a participant device based on a connection between the participant device (or a user account associated with the participant device) and one or more other participant devices within the video room (e.g., the creator device). In some embodiments, the video room system can provide more live video streams to a participant device that joins via a first join method (e.g., selection of a shared video room invite) and can provide fewer live video streams to a participant device that joins via a second join method (e.g., selection of a surfaced video room option).

In some embodiments, the video room system modifies video room streams based on determining or identifying one or more dominant speaker devices. As used herein, the term "dominant speaker device" refers to a participant device categorized, identified, or classified as having a relatively stronger, louder, clearer, or consistent audio signal (e.g., a greater relative measure of spoken audio). The video room system can determine a dominant speaker device within a video room by determining that audio data satisfies one or more factors. Indeed, the video room system can identify a dominant speaker device based on one or more factors relating to the audio data received from participant devices within a video room. For example, the video room system can identify a dominant speaker device as a participant device that provides audio data that satisfies a threshold average volume amplitude over a threshold period of time. As another example, the video room system can identify a dominant speaker device as a participant device that provides a highest average volume amplitude over a particular period of time, as compared to other participant devices in the video room.

In one or more embodiments, the video room system can identify or determine a moderator device from among participant devices within a video room and can assign moderator controls to the moderator device. As used herein, the "moderator device" refers to a participant device granted one or more moderator controls (e.g., privileges to control or modify a video room). In particular, a moderator device can control various aspects of a video room, as designated by moderator controls assigned to the moderator device. Relatedly, the term "moderator controls" refers to one or more digital privileges, rights, features, or functions for modifying characteristics of a video room. Moderator controls can include controls such as locking a video room, excluding or ejecting participant devices from a video room, disabling a video room, limiting a number of participant devices that can access a video room, enabling and disabling screen sharing, and/or muting particular participant devices within the video room.

As suggested, the video room system can determine trustworthiness ratings for participant devices to identify a moderator device for a video room. As used herein, the term "trustworthiness rating" refers to a score or a rating that indicates a level of trustworthiness associated with a participant device (or with a user account of a user operating a participant device). The video room system can determine a trustworthiness rating for a participant device based on a number of factors including join methods by which the participant devices access a video room, report histories associated with the participant devices (e.g., reports of posting or sharing bad or inappropriate content), video room histories (e.g., numbers of join attempts and/or numbers of video rooms joined), abnormal behavior (e.g., creating excessive numbers of video rooms), a completeness of a user profile for a user account, and/or an age of a user account.

In some embodiments, the video room system generates and provides a peephole option for display on a participant device (or a prospective participant device). As used herein, the term "peephole option" refers to a user selectable option or interface element that is selectable to display a visual representation of participants (associated with participant devices) already within a video room (even though the device utilizing the peephole option is not yet participating in the video room). Upon receiving an indication of user selection of a peephole option, the video room system can provide a visual representation of participants for display on a device.

Additional detail regarding the video room system will now be provided with reference to the figures. For example, FIG. 1 illustrates a schematic diagram of an example environment for implementing a video room system 102 in accordance with one or more embodiments. An overview of the video room system 102 is described in relation to FIG. 1. Thereafter, a more detailed description of the components and processes of the video room system 102 is provided in relation to the subsequent figures.

As shown in FIG. 1, the environment includes server(s) 106, participant devices 108a-108n, and a network 112. Each of the components of the environment can communicate via the network 112, and the network 112 may be any suitable network over which computing devices can communicate. Example networks are discussed in more detail below in relation to FIGS. 12 and 13.

As mentioned, the environment includes participant devices 108a-108n. The participant devices 108a-108n can be any of a variety of computing devices, including a smartphone, a tablet, a smart a television, a desktop computer, a laptop computer, a virtual reality device, an augmented reality device, or some other computing device as described in relation to FIGS. 12 and 13. The participant devices 108a-108n can have various performance parameters indicating respective performance capacities of the participant devices 108a-108n. The participant devices 108a-108n can receive user input from users in the form of user actions such as touch gestures, clicks, etc., in relation to user interface elements displayed as part of the video room application 110 (or some other application). For example, the participant devices 108a-108n can receive user input to join a video room and/or to interact within a video room. In some embodiments, the participant devices 108a-108n are associated with a user of the social networking system 104, where users associated with the participant devices 108a-108n have social media accounts or user accounts registered with the social networking system 104. In addition to receiving input, the participant devices 108a-108n can also provide information pertaining to user input to the server(s) 106. In turn, the video room system 102 on the server(s) 106 can receive user input information from the participant devices 108a-108n to indicate actions within the video room application 110 for creating a video room, moderating users within a video room, and distributing live video streams to the participant devices 108a-108n.

As shown, the participant devices 108a-108n include a video room application 110. In particular, the video room application 110 may be a web application, a native application installed on the participant devices 108a-108n (e.g., a mobile application, a desktop application, a web-based browser application, etc.), or a cloud-based application where all or part of the functionality is performed by the server(s) 106. The video room application 110 can have various functions for communicating with other participant devices 108a-108n (e.g., transmitting and receiving audio and video data) and for displaying information such as a video room interface for presenting a video room stream. In some embodiments, the participant devices 108a-108n include additional applications such as a social networking application for a social networking interface including social networking feeds such as an activity feed or a newsfeed.

As illustrated in FIG. 1, the environment includes the server(s) 106 which houses the video room system 102 as part of a social networking system 104. The server(s) 106 may generate, store, process, receive, and transmit electronic data, such as performance parameters, user interaction information, social networking information, and live video streams. For example, the server(s) 106 can transmit data to the participant devices 108a-108n to provide a video room interface via the video room application 110. In some embodiments, the server(s) 106 comprises a content server. The server(s) 106 can also comprise an application server, a communication server, a web-hosting server, a social networking server, a video communication server, or a digital communication management server.

In some embodiments, though not illustrated in FIG. 1, the environment may have a different arrangement of components and/or may have a different number or set of components altogether. For example, the participant devices 108a-108n may communicate directly with the video room system 102, bypassing the network 112. Additionally, the video room system 102 can include one or more additional databases (e.g., a social media account database) housed on the server(s) 106 or elsewhere in the environment. In some embodiments, all or part of the video room system 102 can be located on, and implemented by, one or more devices within the environment. For example, the video room system 102 can be implemented by one or more of the server(s) 106, and/or one or more of the participant devices 108-108n.

Figure 2:
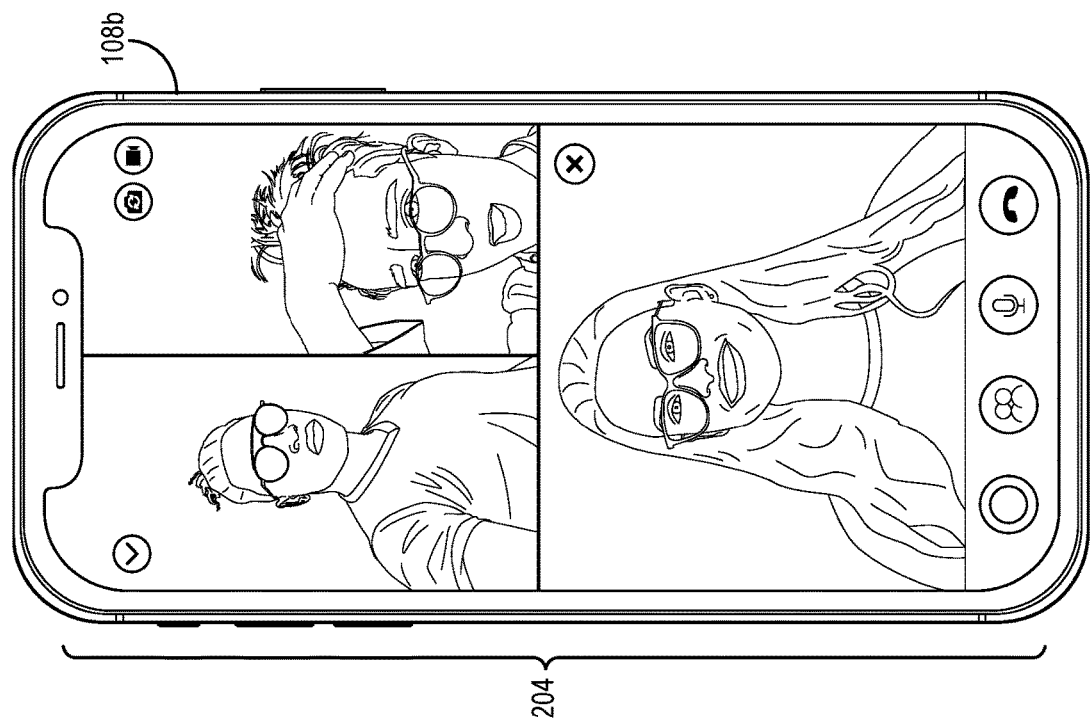
FIG. 2 illustrates example participant devices displaying different video room streams in accordance with one or more embodiments.
Figure 2:
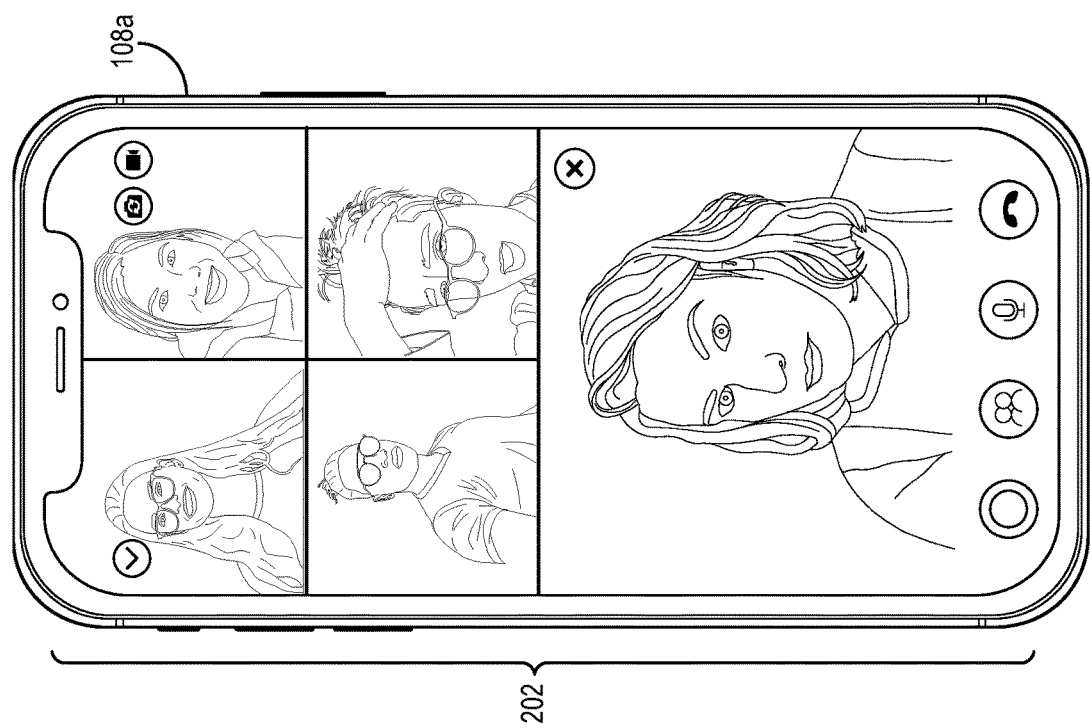

As mentioned, the video room system 102 can provide video room streams to participant devices within a video room. In particular, the video room system 102 can provide different video room streams to different participant devices, with different live video streams displayed on the various participant devices within the video room. FIG. 2 illustrates a participant device 108a and a participant device 108b participating in the same video room and displaying different video room streams in accordance with one or more embodiments.

As illustrated in FIG. 2, the video room system 102 generates and provides a first video room stream 202 for display on the participant device 108a. In addition, the video room system 102 generates and provides a second video room stream 204 for display on the participant device 108b. Indeed, the participant device 108a displays the video room stream 202 including five total live video streams, one captured by the participant device 108a itself and four other live video streams captured by other participant devices within the video room (e.g., the participant device 108b and three others). In addition, the participant device 108b displays the video room stream 204 including three total live video streams, one captured by the participant device 108b itself and two other live video streams captured by other participant devices within the video room (e.g., the participant device 108a and one other). Thus, the video room system 102 can provide different live video streams to different participant devices within the same video room.

Figure 3:
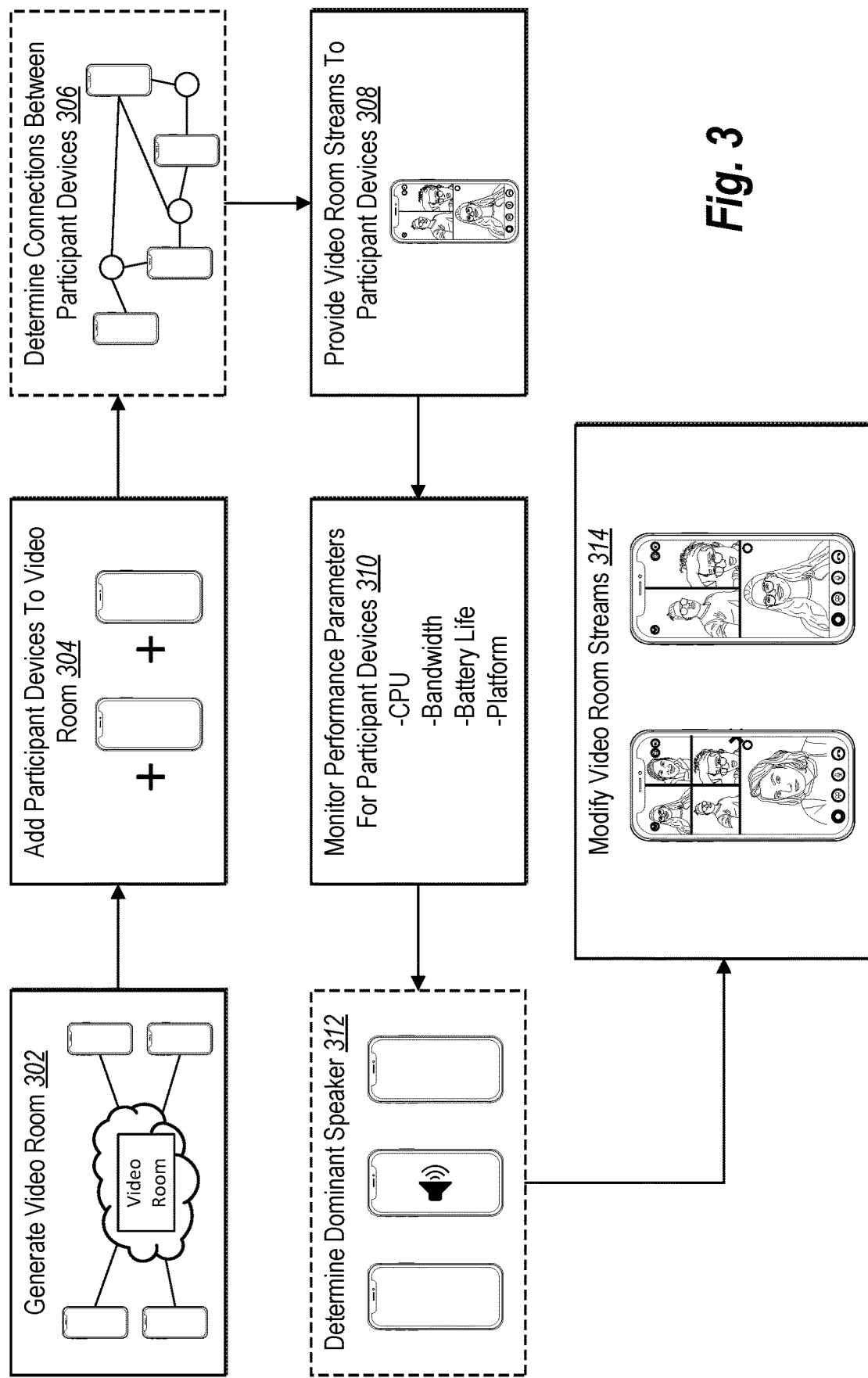
FIG. 3 illustrates a sequence of acts for generating and providing video room streams to participant devices based on performance parameters and other factors in accordance with one or more embodiments.

To generate and provide the video room streams 202 and 204 to the participant devices 108a and 108b, the video room system 102 can determine performance parameters associated with the participant devices 108a and 108b. In particular, the video room system 102 can determine different performance parameters for the participant device 108a than for the participant device 108b and can thus provide different live video streams to the each of the participant devices 108a and 108b. In some embodiments, the video room system 102 determines factors such as social networking connections and/or join methods as part of modifying video room streams. FIG. 3 illustrates providing and modifying video room streams based on performance parameters and other factors in accordance with one or more embodiments.

As illustrated in FIG. 3, the video room system 102 performs an act 302 to generate a video room. In particular, the video room system 102 generates a video room by generating a URL (or other indicator) that designates a digital space for connecting participant devices (e.g., the participant devices 108a and 108b). For example, the video room system 102 generates a video room in response to user interaction to generate a video room (e.g., via a participant device).

In addition, the video room system 102 performs an act 304 to add participant devices to the video room. More specifically, the video room system 102 adds participant devices such as the participant devices 108a and 108b. To add a participant device to the video room, the video room system 102 receives an indication of user selection of a video room link in the form of a shared video room link or a surfaced video room option.

In some embodiments, the video room system 102 provides video room links to participant devices. Particularly, the video room system 102 shares video room invites (or enables a participant device to share video room invites) by generating a shareable video room link based on user input to invite others to join the video room. For example, the video room system 102 shares a selectable video room invite within a message thread. As another example, the video room system 102 automatically surfaces a video room option for display within a social networking feed of a participant device. Indeed, the video room system 102 determines connections between participant devices (or between user accounts) and surfaces a video room option based on the connections.

In addition, the video room system 102 tracks or determines the join methods of each participant device that joins a video room. For example, the video room system 102 determines that the participant device 108a joins the video room via user interaction with a shared video room invite. Further, the video room system 102 determines that the participant device 108b joins the video room via user interaction with a video room option that the video room system 102 automatically surfaces within a social networking feed associated with the participant device 108b.

As further illustrated in FIG. 3, in some embodiments, the video room system 102 performs an act 306 to determine connections between participant devices. For instance, the video room system 102 determines connections between all participant devices within a common video room. To determine connections between participant devices (or between user accounts for user associated with the participant devices), the video room system 102 determines whether the participant devices are associated with user accounts within the social networking system 104 and, for participant device associated with user accounts within the social networking system 104, determines affinities based on nodes and edges of a social graph. For example, the video room system 102 determines affinities based on relationships or levels of interest between participant devices, as indicated by friends lists, interactions between participant devices (or between user accounts), and similarities in subject matter or content of interest. Indeed, as used herein, a "connection" between two participant device or between two user accounts can refer to an affinity between the participant devices or between the user accounts within a social graph. For a participant device not associated with a user account within the social networking system 104, the video room system 102 determines that no connection exists for the participant device (or that the participant device has a default connection).

In some embodiments, the video room system 102 determines a connection between a joining participant device and a creator device (e.g., a participant device that creates a video room). In at least one embodiment, the video room system 102 determines, for a given participant device, connections with all other participant devices within a video room and selects a strongest or closest connection as a representative connection for the participant device. In one or more embodiments, the video room system 102 determines an aggregate connection for each participant device by determining a combined connection (e.g., a weighted average of connections to other participant devices in the video room).

In addition, the video room system 102 determines closeness of the connections between participant devices. More specifically, the video room system 102 determines closeness based on factors such as time that two user accounts have been friends, a number and/or frequency of communications between participant devices, and/or a number of common or shared friends between the user accounts. As used herein, "closeness" can refer to an affinity coefficient, as set forth in further detail below. Indeed, additional detail regarding determining connections and closeness of the connections based on social network affinity is provided below with reference to FIG. 14.

As further illustrated in FIG. 3, the video room system 102 performs an act 308 to provide video room streams to participant devices. In particular, the video room system 102 provides each provider device within a video room a video room stream for display, each video room stream including one or more live video streams. For instance, the video room system 102 provides the video room stream 202 to the participant device 108a, and the video room system 102 provides the video room stream 204 to the participant device 108b.

In some embodiments, the video room system 102 determines performance parameters before performing the act 308 to provide video room streams. To elaborate, the video room system 102 accesses device specifications and/or performs one or more performance tests to determine performance parameters of a participant device. For example, the video room system 102 tests connectivity speed or bandwidth of a participant device, remaining battery life of the participant device, processing capacity of the participant device, and further determines an access platform by which the participant device is accessing the video room. Based on the performance parameters for each participant device, the video room system 102 selects live video streams to provide to the participant devices. For instance, the video room system 102 provides more live video streams to participant devices with higher performance parameters and provides fewer live video streams to participant devices with lower performance parameters.

As shown, the video room system 102 further performs an act 310 to monitor performance parameters for participant devices. More particularly, the video room system 102 continuously (or periodically) monitors performance parameters associated with each participant device within a video room to detect changes. For example, the video room system 102 repeats one or more performance parameter tests such as a network test, a processing capacity test, or a battery life test. In some embodiments, the video room system 102 periodically requests indications of performance parameters from a participant device, whereupon the participant device provides indications of all requested performance parameters. Thus, in some embodiments, the video room system 102 causes a participant device to perform diagnostics to determine performance parameters to provide to the video room system 102. By monitoring performance parameters in this way, the video room system 102 maintains an up-to-date measure of performance capabilities of participant devices (e.g., as network connectivity changes, as processing capacity changes, or as battery life changes). Additional detail regarding determining performance parameters is provided below with reference to subsequent figures.

In some embodiments, the video room system 102 performs an act 312 to determine or identify one or more dominant speaker devices. Particularly, the video room system 102 determines a dominant speaker device as a participant device from which the video room system 102 receives at least a threshold amount (e.g., duration) of voice audio over a given time period. For example, the video room system 102 monitors audio data for the participant devices within a video room and determines which participant devices are capturing voice data from users. The video room system 102 further compares the voice data for participant devices to identify a single (or a top number of) participant device(s) that is/are capturing more voice audio than other participant devices. In some embodiments, the video room system 102 identifies a dominant speaker device as a participant device from which audio data having at least a threshold average volume amplitude (of voice audio) for a threshold period of time is received. In these or other embodiments, the video room system 102 identifies a participant device with the most recently captured voice audio as a dominant speaker device. In addition, the video room system 102 continuously compares audio data received from participant devices to update dominant speaker devices. Additional detail regarding determining dominant speaker devices is provided below with reference to subsequent figures.

As illustrated in FIG. 3, the video room system 102 further performs an act 314 to modify video room streams. For instance, the video room system 102 determines to modify the video room streams based on determining that a video room includes at least a threshold number of participant devices. The video room system 102 dynamically modifies (e.g., modifies in real time or near real time based on updated changes) video room streams based on performance parameters of participant devices. In some embodiments, the video room system 102 modifies video room streams further based on join methods of participant devices, connections between participant device, and/or identifying dominant speaker devices. The video room system modifies video room streams by adding (e.g., providing additional) and/or removing (e.g., refraining from or ceasing providing) live video streams for participant devices. Thus, the video room system 102 provides different live video streams to different participant devices within a video room.

As mentioned, the video room system 102 modifies video room streams based on performance parameters. More specifically, the video room system 102 reduces or increases a number of live video streams to provide to participant devices based on their respective performance parameters. For example, the video room system 102 provides more live video streams to the participant device 108a than to the participant device 108b because the video room system 102 determines higher performance parameters for the participant device 108a than for the participant device 108b. As another example, the video room system 102 reduces or increases a live video stream quality for one or more live video streams (e.g., to provide a higher-resolution version or a lower-resolution version of a live video stream) provided to a participant device based on performance parameters. In some embodiments, the video room system 102 determines that the performance parameters of a given participant device are adequate for providing only a single live video stream to the participant device. In these or other embodiments, the video room system 102 determines that the performance parameters of a participant device are too low for providing any live video streams. For these devices, the video room system 102 provides live audio streams by identifying and selecting one or more live audio streams based on performance parameters, join methods, connections, and identifying dominant speaker devices (as described herein in relation to live video streams).

Indeed, in certain implementations, the video room system 102 limits a number of live video streams and/or live audio streams for one or more participant devices. For example, the video room system 102 determines performance parameters of the participant devices. Based on the performance parameters, the video room system 102 customizes a number of live video streams and/or live audio streams individually provided to the respective participant devices (e.g., where live video streams require higher performance parameters than live audio streams). In some embodiments, the video room system 102 converts a live video stream to a live audio stream (e.g., by extracting only audio data) to provide to a participant device with performance parameters that fail to satisfy a threshold measure of performance.

As an example, the video room system 102 determines that a first participant device has high performance capabilities (that satisfy a higher threshold performance) and provides a larger number of video streams. In addition, the video room system 102 determines a mid-level performance capability (to satisfy a lower threshold performance) for a second participant device and provides a reduced number of live video streams along with a number of live audio streams (in lieu of corresponding live video streams). Further, the video room system 102 determines a lower performance capability (failing to satisfy a threshold performance) for a third participant device and provides no live video streams and a reduced number of live audio streams.

In some embodiments, the video room system 102 modifies video room streams based on join methods in addition (or alternatively) to performance parameters. For example, performance parameters permitting, the video room system 102 provides more live video streams to participant devices that join via a shared video room invite than for participant devices that join via a surfaced video room option. In some embodiments, the video room system 102 modifies video room streams by prioritizing which live video streams to provide to participant devices based on join methods. For instance, the video room system 102 prioritizes (e.g., is more likely to provide) live video streams received from participant devices that join a video room via a shared video room invite. Indeed, the video room system 102 is less likely to provide live video streams received from participant devices that join a video room via a surfaced video room option.

In one or more embodiments, the video room system 102 modifies video room streams based on connections between participant devices (e.g., connections within a social graph of the social networking system 104). Particularly, the video room system 102 modifies a video room stream by providing more live video streams (performance parameters permitting) to participant devices with stronger or closer connections. Conversely, the video room system 102 provides fewer live video streams to participant devices with weaker or farther connections. In some embodiments, the video room system 102 determines that a connection of a participant device is below a connection closeness threshold, and the video room system 102 thus provides only live audio streams to the participant device.

In some embodiments, the video room system 102 modifies video room streams based on dominant speaker devices. More specifically, the video room system 102 is more likely to provide live video streams received from participant devices that are identified as dominant speaker devices. In cases where the video room system 102 identifies multiple dominant speaker devices, the video room system 102 is more likely to provide live video streams from one or more of the dominant speaker devices (e.g., a most dominant speaker device or all dominant speaker devices).

Along these lines, the video room system 102 further modifies video room streams by dropping audio (e.g., refraining from providing audio data) for live video streams where a user is not talking. Indeed, the video room system 102 determines whether a user is talking based on audio and/or video analysis of a live video stream. Upon determining that the user is not talking, the video room system 102 removes, or refrains from providing, audio information together with the video information of the live video stream. The video room system 102 further monitors the live video stream for changes and modifies the live video stream based on detected changes to, for example, provide audio data for the live video stream when the user begins talking. Dropping audio information in this way further saves computing resources on the part of participant devices by alleviating the need to decode and process additional audio information for live video streams that are not capturing voice audio in the first place.

In one or more embodiments, the video room system 102 prioritizes live video streams for participant devices that are capturing video. Indeed, one or more participant devices may have video turned off, and the video room system 102 determines that the streams received from these participant devices are less of a priority to provide to other participant devices as part of a video room stream. Thus, the video room system 102 is more likely to provide live video streams received from participant devices that are capturing video than for participant devices that are only capturing audio. Similarly, the video room system 102 is more likely to provide live video streams received from participant devices that are capturing both video and audio than for participant devices that are muted (or are not capturing audio).

Based on the above factors, the video room system 102 provides different live video streams to different participant devices. In one or more embodiments, the video room system 102 bases the video room stream provided to a particular participant device primarily on performance parameters. In other words, the video room system 102 determines that performance parameters for a participant device are sufficient to provide a particular number of live video streams to the participant device. To determine the particular number of live video streams, the video room system 102 selects live video streams based on a combination (e.g., a weighted combination) of other factors including join method, connection closeness, and dominant speaker devices. For example, the video room system 102 weights dominant speaker devices most heavily and connections least heavily among the factors.

Additionally, as the video room system 102 detects changes in performance parameters for a participant device, the video room system 102 reduces or increases the number of live video streams provided to the participant device (e.g., by identifying those live video streams received from participant devices with the highest weighted combinations of factors). For a given participant device, the video room system 102 determines live video stream scores for live video streams received from other participant device within the video room. For instance, the video room system 102 determines live video stream scores as the weighted combinations of factors (e.g., the weighted combination of connection closeness, join method, and dominant speaker devices) associated with each participant device. Thus, the video room system 102 selects live video streams to provide to the given participant device by identifying those live video streams with higher live video stream scores. In some embodiments, the video room system 102 determines live audio stream scores based on the same or similar criteria.

As an example, the video room system 102 determines both a number of live video streams (and/or live audio streams) to provide to a participant device and also determines which live video streams (and/or live audio streams) to provide from among those within the video room. Indeed, the video room system 102 determines performance parameters for a participant device and determines a number of live video streams and/or live audio streams to provide to the participant device based on the performance parameters. In addition, the video room system 102 selects the determined number of live video streams and/or live audio streams to provide from among those within the video room. Specifically, the video room system 102 selects from among the available live video streams based on the live video stream scores.

Figure 4:
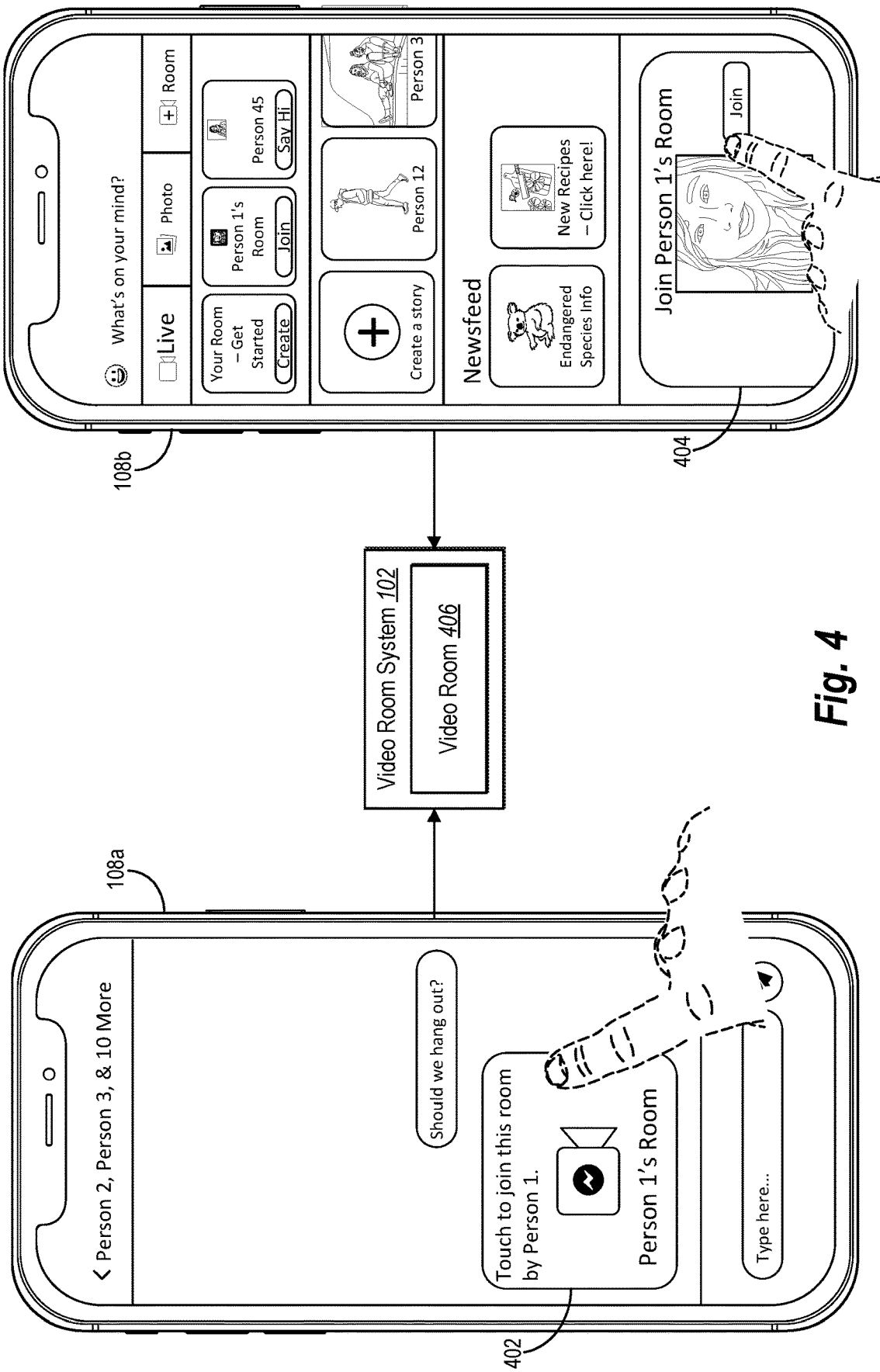
FIG. 4 illustrates a diagram of determining join methods for participant devices in accordance with one or more embodiments.

As mentioned, the video room system 102 can track or determine join methods by which participant devices join a video room. In particular, the video room system 102 can determine whether a participant device joins a video room via a shared video room invite or via a surfaced video room option that is not expressly shared to the participant device. FIG. 4 illustrates the participant device 108a joining a video room 406 via a first join method and the participant device 108b joining the video room 406 via a second join method in accordance with one or more embodiments. As mentioned above, the video room system 102 provides different live video streams (and/or different numbers of live video streams) to participant devices based on respective join methods.

As illustrated in FIG. 4, the video room system 102 receives an indication of user selection of a shared video room invite 402 from the participant device 108a. Indeed, the video room system 102 receives a request to join the video room 406, where the request includes information indicating that the request originated from the shared video room invite 402. For example, a creator device or some other participant device with permission to share video room invites for the video room 406 shares the video room invite 402 within a message thread that includes the participant device 108a. In response to user interaction selecting the video room invite 402, the video room system 102 adds the participant device 108a to the video room 406 and identifies the join method for the participant device 108a as selection of the video room invite 402.

As further illustrated in FIG. 4, the video room system 102 receives an indication of user selection of a surfaced video room option 404. In particular, the video room system 102 receives a request to join the video room 406, where the request includes information indicating that the request originated from the video room option 404. For example, the video room system 102 surfaces the video room option 404 within a social networking feed presented on the participant device 108b. Indeed, the video room system 102 determines a connection between the participant device 108b and a creator device for the video room 406 (or another participant device within the video room), and the video room system 102 automatically (e.g., without user input) surfaces the video room option 404 for display within the social networking feed on the participant device 108b based on the connection. In response to user interaction selecting the video room option 404, the video room system 102 adds the participant device 108b to the video room 406 and identifies the join method as selection of the surfaced video room option 404. In one or more embodiments, the video room system 102 determines additional or alternative join methods such as selection of a video room option provided via an email, a text message, or within some other messaging application.

Figure 5:
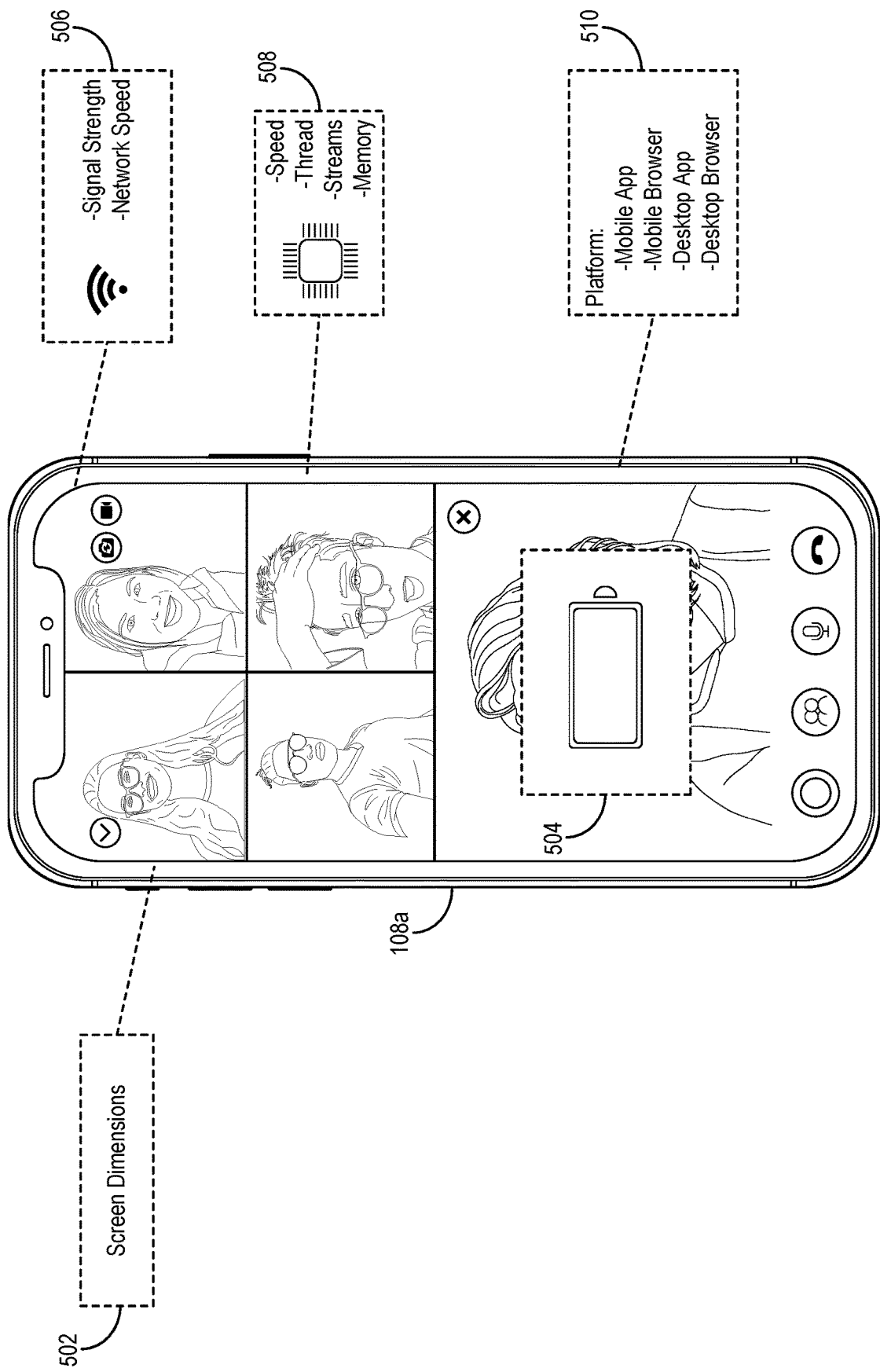
FIG. 5 illustrates a diagram of determining performance parameters for a participant device in accordance with one or more embodiments.

As mentioned, the video room system 102 can determine and monitor performance parameters for participant devices within a video room (e.g., within the video room 406). In particular, the video room system 102 can monitor performance parameters to detect changes over time for modifying video room streams provided to participant devices. FIG. 5 illustrates a diagram of performance parameters associated with the participant device 108a in accordance with one or more embodiments.

As illustrated in FIG. 5, the video room system 102 determines a performance parameter in the form of screen dimensions 502 of the participant device 108a. Specifically, the video room system 102 requests and receives an indication from the participant device 108a that includes the screen dimensions 502 in pixels or other units (e.g., centimeters or inches) for height and width. In some embodiments, the video room system 102 determines a device type associated with the participant device 108a upon allowing the participant device 108a into the video room 406, which information includes the screen dimensions of the participant device 108a.

Based on the screen dimensions 502, the video room system 102 modifies the video room stream provided to the participant device 108a. For example, the video room system 102 provides more live video streams (other performance parameters permitting) to a participant device that has a larger screen and provides fewer live video streams to a participant device that has a smaller screen. Indeed, to maintain efficacy and clarify of the video room interface on each participant device within the video room 406, the video room system 102 modifies video room streams based on respective screen dimensions of the participant devices.

As illustrated in FIG. 5, the video room system 102 determines and monitors a battery level or a battery life 504 for the participant device 108a. In particular the video room system 102 determines the battery life 504 by requesting and receiving an indication of battery information from the participant device 108a. The video room system 102 further monitors the battery life 504 to detect changes in how much battery life is remaining in the battery of the participant device 108a. For example, the video room system 102 periodically requests and receives battery information from the participant device 108a. In some embodiments, the video room system 102 determines a total battery capacity in addition to the remaining battery life 504.

Based on the battery life 504 (or the total battery capacity), the video room system 102 modifies the video room stream provided to the participant device 108a. For example, the video room system 102 provides fewer and fewer live video streams to the participant device 108a (and/or replaces live video streams with live audio streams) as the battery life 504 reduces over time. Thus, the video room system 102 saves or preserves battery life of the participant device 108a by automatically adjusting a video room stream to require less battery power to decode and display live video streams. In some embodiments, the video room system 102 provides an initial number of live video streams for a fully charged battery and reduces the number as the battery life 504 decreases. In one or more embodiments, the video room system 102 determines a larger initial number of live video streams for participant devices with larger batteries that have larger total battery capacities.

In addition, the video room system 102 determines and monitors a bandwidth 506 for the participant device 108a. In particular, the video room system 102 determines an amount of information that the participant device 108a can send and receive via a network connection. For instance, the video room system 102 determines a level of network connectivity including a signal strength and a network speed for a network connection of the participant device 108a. To determine the bandwidth 506, the video room system 102 requests and receives network information from the participant device 108a. In some embodiments, the video room system 102 performs a network test to determine the bandwidth 506 by determining an upload and/or a download speed of the participant device 108a. Similarly, in some embodiments the video room system 102 determines the type of network connection and modifies the video streams accordingly (e.g., greater video streams for wi-fi connections or 5G connections compared to 3G connections).

The video room system 102 further monitors the bandwidth 506 for changes over time. For example, if the participant device 108a moves to an area with a weaker signal strength or hands off from a wi-fi connection to a mobile data connection (e.g., a slower data connection), the video room system 102 modifies a video room stream accordingly. Indeed, the video room system 102 modifies the video room stream provided to the participant device 108a in real time to reduce or increase the number of live video streams provided to the participant device 108a based on the bandwidth 506.

As further illustrated in FIG. 5, the video room system 102 determines and monitors a processing capacity 508 of the participant device 108a. In particular, the video room system 102 determines the processing capacity 508 including a processor speed, a number of processor threads, a memory capacity, and a number of streams that the processor can decode simultaneously. For example, the video room system 102 determines the processing capacity 508 by requesting and receiving processing information from the participant device 108a. In some embodiments, the video room system 102 determines the processing capacity 508 by performing (or by causing the participant device 108a to perform) a processing test.

The video room system 102 further monitors the processing capacity 508 to detect any changes in processing capacity over time. For example, the participant device 108a may begin (or stop) performing other tasks which alters the processing capacity 508 available for decoding and displaying live video streams for the video room 406. As another example, the participant device 108a may enter a power saver mode (e.g., if battery life is low) which limits a processing capacity of the participant device 108a. Based on the processing capacity 508, the video room system 102 provides more or fewer live video streams to the participant device 108a. For instance, the video room system 102 provides more live video streams to a participant device with higher processing capacity and provides fewer live video streams to a participant device with lower processing capacity.

As further illustrated in FIG. 5, the video room system 102 determines an access platform 510 for the participant device 108a. In particular, the video room system 102 determines an access platform 510 that the participant device 108a utilizes the access the video room. For example, the video room system 102 determines the access platform 510 by requesting and receiving access platform information that indicates whether the participant device 108a is accessing the video room 406 via a mobile application, a mobile browser, a desktop application, or a desktop browser (including information indicating the specific application or browser used as the access platform 510). In some embodiments, the video room system 102 determines the access platform 510 upon (or before) allowing the participant device 108 to access the video room 406 as part of a verification or an authentication process.

Based on the access platform 510, the video room system 102 customizes or modifies the video room stream provided to the participant device 108a. More specifically, the video room system 102 modifies the number of live video streams to provide to the participant device 108a based on the access platform 510. For instance, if the participant device 108a is accessing the video room 406 via a mobile browser (e.g., a mobile browser that is less integrable with external systems), the video room system 102 reduces the number of video streams provided to the participant device 108a. Indeed, some mobile browsers have less functional or fewer accessible APIs for providing live video streams for display, and the video room system 102 adjusts a video room stream accordingly. If the participant device 108a is accessing the video room via a mobile application (e.g., the video room application 110), on the other hand, the video room system 102 provides more live video room streams because the functionality of the mobile application facilitates easier streaming and decoding of live video streams.

In some embodiments, the video room system 102 generates a performance parameter score for the participant device 108a (and for other participant devices within the video room 406). More specifically, the video room system 102 generates a performance parameter score that indicates a measure or a rating of how many live video streams the participant device 108a can decode at a given time. The video room system 102 generates a performance parameter score by combining two or more of the performance parameters 502-510. For instance, the video room system 102 generates a weighted combination (e.g., a weighted linear combination) of the performance parameters 502-510. In some embodiments, the video room system 102 weights the performance parameters 502-510 equally. In other embodiments, the video room system 102 weights some performance parameters such as the access platform 510 more heavily than other performance parameters such as the screen dimensions 502. The video room system 102 further modifies the performance parameter score based on monitoring changes for the various performance parameters 502-510 to adjust the number of live video streams provided to the participant device 108a.

By determining and monitoring the performance parameters 502-510, the video room system 102 improves efficiency over conventional systems. Indeed, by selectively providing live video streams, the video room system 102 reduces the computation requirements for the participant device 108a to decode and display live video streams. Thus, not only is the video room system 102 more efficient than conventional systems, but the video room system 102 also flexibly tailors video room streams for each participant device within a video room. Further, the video room system 102 flexibly modifies video room streams for each participant device as performance parameters of the participant devices change over time.

Figure 6:
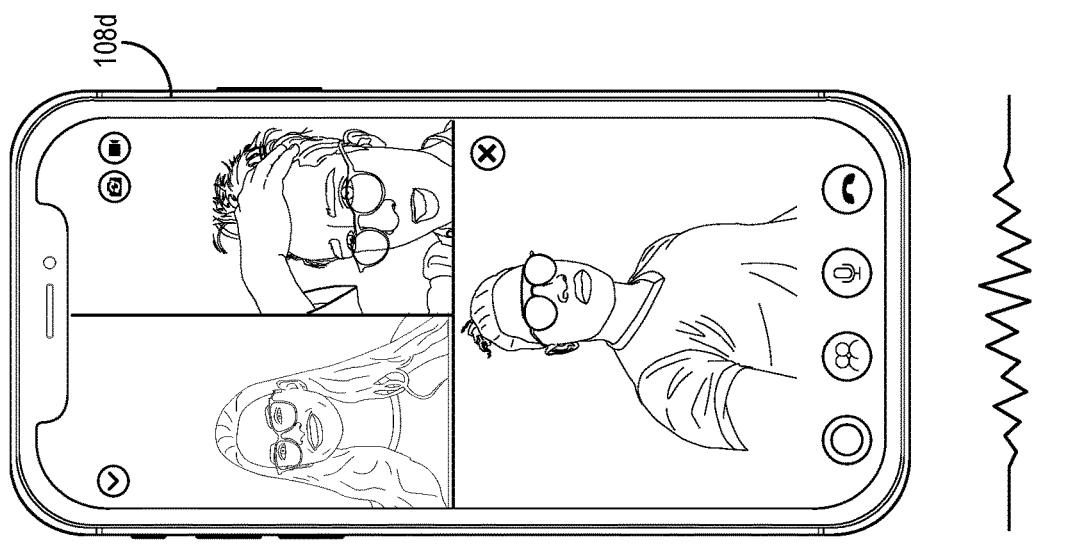
FIG. 6 illustrates a diagram of identifying a dominant speaker device in accordance with one or more embodiments.
Figure 6:
Figure 6:
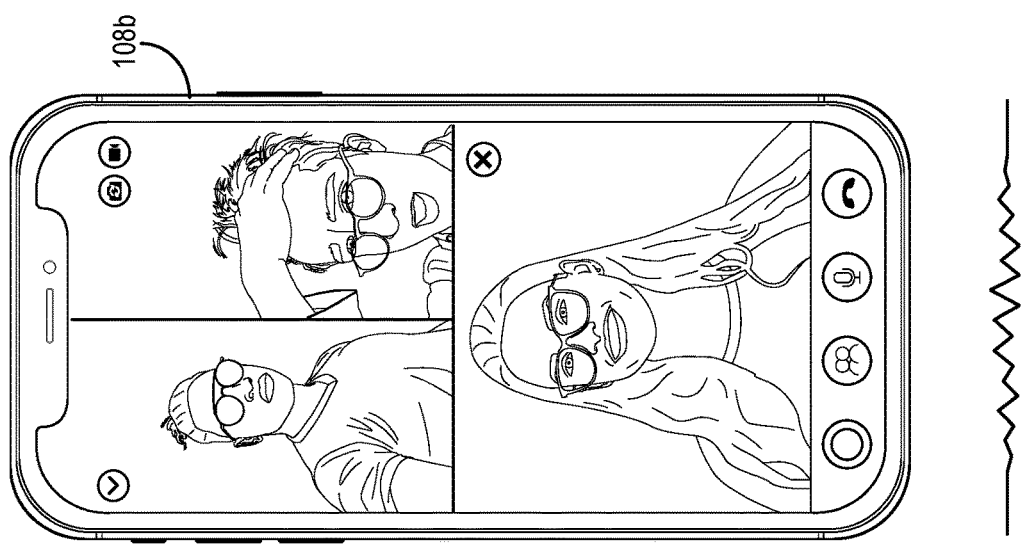

As mentioned, the video room system 102 can determine or identify dominant speaker devices within a video room (e.g., the video room 406). In particular, the video room system 102 can identify one or more participant devices as dominant speaker devices based on audio data received from the participant devices participating in a video room. FIG. 6 illustrates a representation of identifying a dominant speaker device in accordance with one or more embodiments.

As illustrated in FIG. 6, the video room system 102 receives audio data from three participant devices 108b-108d within the video room 406. Indeed, FIG. 6 represents the audio data with waveforms below the respective participant devices 108*b*-108*d*. As shown, the video room system 102 receives audio data from the participant device 108*b* with low volume amplitude. The video room system 102 also receives audio data from the participant device 108*d* with slightly higher volume amplitude than the audio data from the participant device 108*b*. Additionally, the video room system 102 receives audio data from the participant device 108*c* with the highest volume amplitude among the participant devices 108*b*-108*d*.

Based on the audio data illustrated in FIG. 6, the video room system 102 identifies the participant device 108*c* as a dominant speaker device. Indeed, the video room system 102 compares the audio data received from the participant devices 108*b*-108*d* to determine that the audio data from the participant device 108*c* has the highest volume amplitude. In some embodiments, the video room system 102 determines that the audio data from the participant device 108*c* has the highest average volume amplitude. Indeed, the video room system averages the volume amplitude of audio received over a threshold period of time (e.g., a most recent 5 seconds or a most recent 30 seconds). In these or other embodiments, the video room system 102 compares the average volume amplitude to a threshold volume amplitude. Thus, video room system 102 identifies the participant device 108*c* as a dominant speaker device because the average volume amplitude of the audio data received from the participant device 108*c* meets or exceeds the threshold volume amplitude.

In addition, (or alternatively), the video room system 102 analyzes audio data received from the participant devices 108*b*-108*d* to determine which audio data corresponds to voice audio or verbal audio and which audio data does not. Particularly, the video room system 102 identifies audio data that fluctuates like speech patterns. In some embodiments, the video room system 102 analyzes video data together with audio data to determine which audio data corresponds to voice data. For instance, the video room system 102 utilizes a voice isolation model (e.g., an off-the-shelf voice isolation model or a customized voice isolation model) or some other machine-learning-based model to isolate voices from other audio. Indeed, the video room system 102 accesses an application programming interface ("API") or a library of machine learning models to utilize a machine learning model trained for audio classification (e.g., to classify voice audio separately from other audio).

In some cases, the video room system 102 analyzes video data to identify mouth movement of a user operating the participant device 108*c* and compares the mouth movement with audio data. Indeed, the video room system 102 receives audio data from the participant device 108*c* to compare with the mouth movement to determine that the audio data includes voice audio.

Additionally, the video room system 102 filters out noise from received audio data. To elaborate, the video room system 102 filters out or ignores audio data from participant devices that are capturing noise audio (e.g., audio other than voice audio). Thus, even if the video room system 102 receives audio data from a participant device that has high volume amplitude but that consists mostly or entirely of background noise, the video room system 102 refrains from identifying the participant device as a dominant speaker device.

Figure 7:
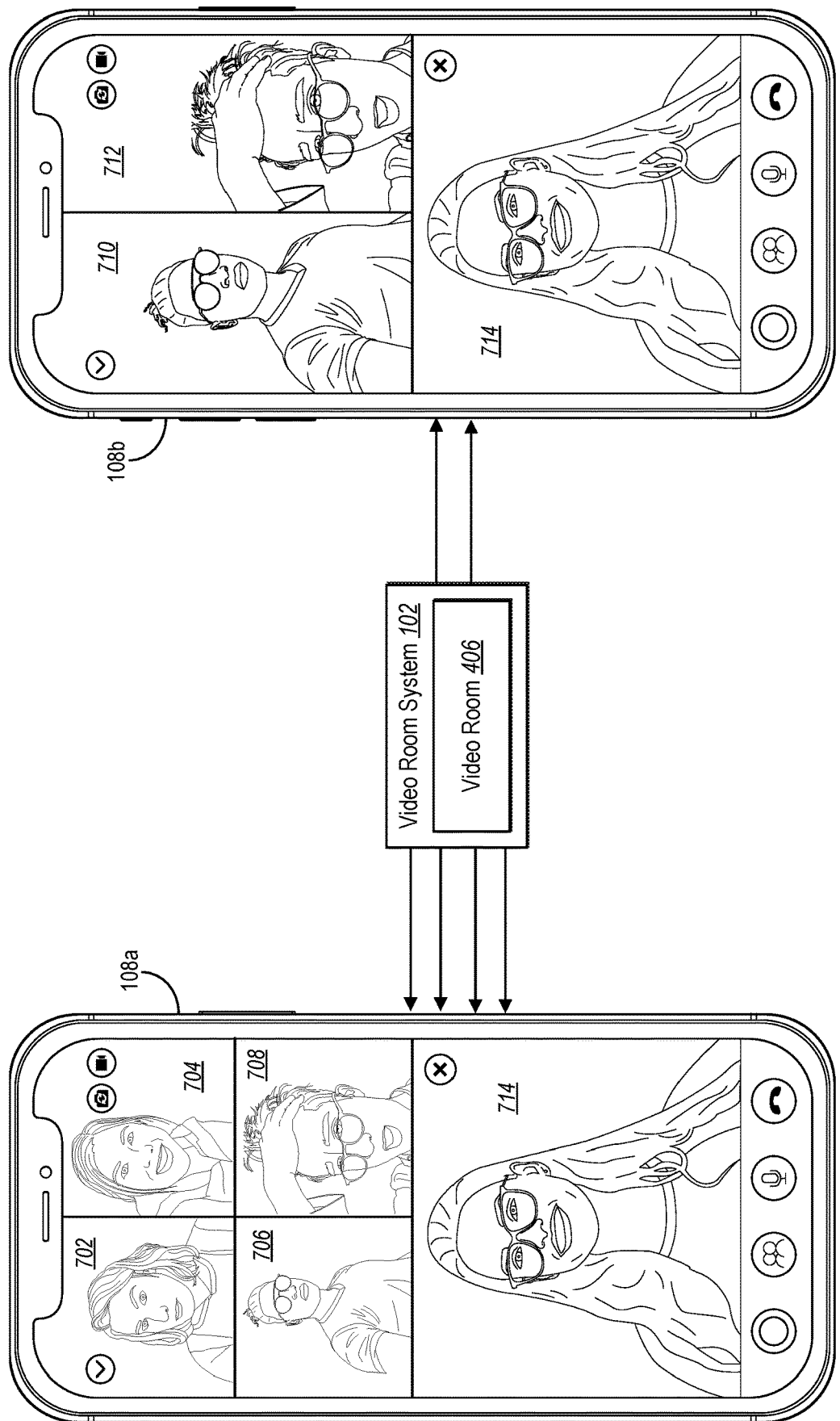
FIG. 7 illustrates an example diagram of providing live video streams to participant devices in accordance with one or more embodiments.

As mentioned above, the video room system 102 can modify and customize video room streams for individual participant devices. In particular, the video room system 102 can identify live video streams to provide to particular participant devices based on factors such as performance parameters, connection closeness, join methods, and identification of dominant speaker devices. FIG. 7 illustrates a diagram of providing different live video streams to different participant devices in accordance with one or more embodiments.

As illustrated in FIG. 7, the video room system 102 provides different numbers of live video streams to the participant device 108*a* and to the participant device 108*b*. Indeed, participant device 108*a* displays five live video streams provided by the video room system 102, such as the live video stream 702, the live video stream 704, the live video stream 706, the live video stream 708, and the live video stream 714. Additionally, the participant device 108*b* displays three live provided by the video room system 102, such as the live video stream 710, the live video stream 712, and live video stream 714.

Indeed, the video room system 102 provides five live video streams 702-708 and 714 to the participant device 108*a* and provides three live video streams 710-714 to the participant device 108*b*. For example, the video room system 102 determines differences between performance parameters of the participant device 108*a* and performance parameters of the 108*b* to provide more live video streams to the participant device 108*a*. Particularly, the video room system 102 determines higher performance parameters for the participant device 108*a* than for the participant device 108*b* and therefore provides more live video streams to the participant device 108*a* and fewer live video streams to the participant device 108*b*.

In certain implementations, the video room system 102 customizes which live video streams and/or live audio streams to provide to which participant devices based on join methods of the participant devices. For instance, the video room system 102 selects live video streams to provide to one participant device based on join methods of other participant devices. In some cases, the video room system 102 determines that live video streams from participant devices that join the video room via certain join methods are prioritized over live video streams from participant devices that join via other methods.

For example, if the video room system 102 determines that the participant device 108*b* joins the video room via a video room option expressly shared with the participant device 108*b*, then the video room system 102 is more likely to provide the live video stream from the participant device 108*b* to the participant device 108*a* (depending on the performance parameters of the participant device 108*a*). Comparatively, if the video room system 102 determines that a participant device 108*c* joins the video room via a video room option surfaced within a social networking interface, then the video room system 102 is less likely to provide the live video stream received from the participant device 108*c* to the participant device 108*a*.

Additionally, the video room system 102 determines join methods and connection closeness associated with the participant device 108*a* and the participant device 108*b*. For instance, the video room system 102 determines that the participant device 108*a* joins the video room 406 via user selection of a shared video room invite. In addition, the video room system 102 determines that the participant device 108*b* joins the video room 406 via user selection of a video room option surfaced within a social networking feed (and not expressly shared with the participant device 108*b*). The video room system 102 thus provides more live video room streams to the participant device 108*a* than to the participant device 108*b* based on their respective join methods.

Further, the video room system 102 determines that the user account of the user operating the participant device 108a has a closer social networking connection to the video room 406 than the user account of the user operating the participant device 108b. To elaborate, the video room system 102 determines that the participant device 108b has no social networking account or has farther/weaker connections with a creator device (or other participant devices) of the video room 406. Thus, the video room system 102 provides more live video streams to the participant device 108a and provides fewer live video streams to the participant device 108b.

In addition, the video room system 102 determines or identifies dominant speaker devices. For example, the video room system 102 modifies video room streams provided to the participant device 108a and the participant device 108b to include a live video stream from a dominant speaker device. In some embodiments, the video room system 102 modifies or customizes a video room stream to change how live video streams are displayed. For instance, the video room system 102 provides video room streams that cause the participant device 108a and the participant device 108b to display the live video stream 714 received from a dominant speaker device as the largest or more prominent live video stream. As another example, the video room system 102 provides a video room stream that causes the participant device 108a to display a live video stream received from a participant device that has a closest connection with the participant device 108a.

In at least one embodiment, the video room system 102 enables participant device (e.g., the participant device 108a or the participant device 108b) to select live video streams for display (or to prioritize for display, performance parameters permitting). For example, the video room system 102 provides a visual representation of participants within the video room 406 for display on the participant device 108a from which a user can select to indicate live video streams to prioritize. Upon receiving an indication of user selection of one or more of the participants, the video room system 102 prioritizes the live video streams received from the corresponding participant devices within the video room 406 in providing and/or modifying the video room stream for the participant device 108a.

Figure 8:
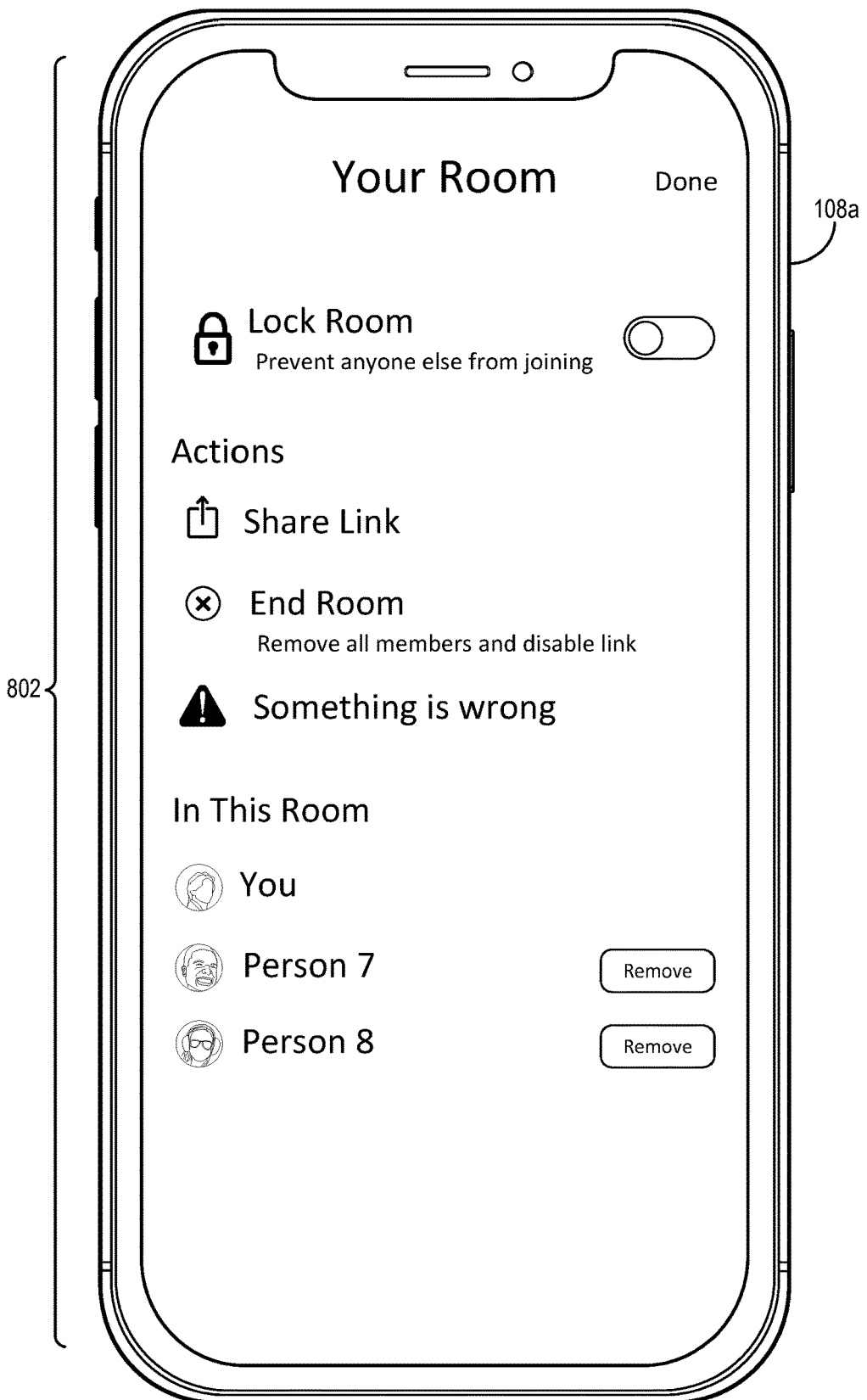
FIG. 8 illustrates a moderator control interface in accordance with one or more embodiments.

In one or more embodiments, the video room system 102 identifies or determines a moderator device for a participant device. In particular, the video room system 102 can identify a moderator device and can assign moderator controls to the moderator device to control certain aspects of a video room (e.g., the video room 406). FIG. 8 illustrates an example moderator control interface 802 including moderator controls in accordance with one or more embodiments.

As illustrated in FIG. 8, the video room system 102 the participant device 108a displays a moderator control interface 802 that includes moderator controls for controlling certain aspects of the video room 406. Indeed, the moderator control interface 802 includes moderator controls such as locking the video room 406 ("Lock Room"), booting or removing participant device from the video room 406 ("Remove"), and disabling the video room ("End Room"). Other moderator controls include limiting a number of participant devices that can access a video room, enabling and disabling screen sharing, and/or muting particular participant devices within the video room.

In some embodiments, the video room system 102 identifies a creator device as a moderator device. In other embodiments, or in cases where a creator device has not yet joined (or has left) the video room 406, the video room system 102 identifies a different participant device as a moderator device. To identify the participant device 108a as a moderator device, the video room system 102 determines a trustworthiness rating for the participant device 108a. In particular, the video room system 102 determines a trustworthiness rating based on various factors associated with the participant device 108a (or associated with a user account of a user operating the participant device 108a).

For example, the video room system 102 determines a join method associated with the participant device 108a. In some embodiments, the video room system 102 determines higher trustworthiness ratings for participant devices that join a video room via user selection of a shared video room link than for participant devices that join the video room via other join methods.

In addition, the video room system 102 determines a report history associated with the participant device 108a. For instance, the video room system 102 determines or accesses a history of reports made of a user account associated with the participant device 108a for posting or sharing inappropriate content. Further, the video room system 102 determines a video room history associated with the participant device 108a. Indeed, the video room system 102 determines or accesses a history of join attempts and creations of video rooms for a user account associated with the participant device 108a. If the video room system 102 determines that the user account has attempted more join attempts than a threshold number and/or has created more than a threshold number of video rooms (and/or has shared a video room invite more than a threshold number of times), then the video room system 102 determines a lower trustworthiness rating for the participant device 108a.

In some embodiments, the video room system 102 determines an age and/or a completeness of a user profile associated with a user account as part of a trustworthiness rating. Particularly, the video room system 102 determines how much information the user profile includes, where a more complete user profile corresponds to a higher trustworthiness rating. Similarly, the video room system 102 determines a higher trustworthiness rating for an older user account.

In one or more embodiments, the video room system 102 determines a trustworthiness rating based on a combination of the above factors. The video room system 102 further identifies the participant device 108a as a moderator device (e.g., in addition to, or alternatively to, another participant device or a creator device) based on determining that the trustworthiness rating for the participant device 108a meets or exceeds a trustworthiness rating threshold. In cases where the video room system 102 identifies more than one participant device with trustworthiness ratings that satisfy the trustworthiness rating threshold, the video room system 102 compares the trustworthiness ratings of those participant devices to identify a participant device with a highest trustworthiness rating to assign as the moderator device.

Figure 9:
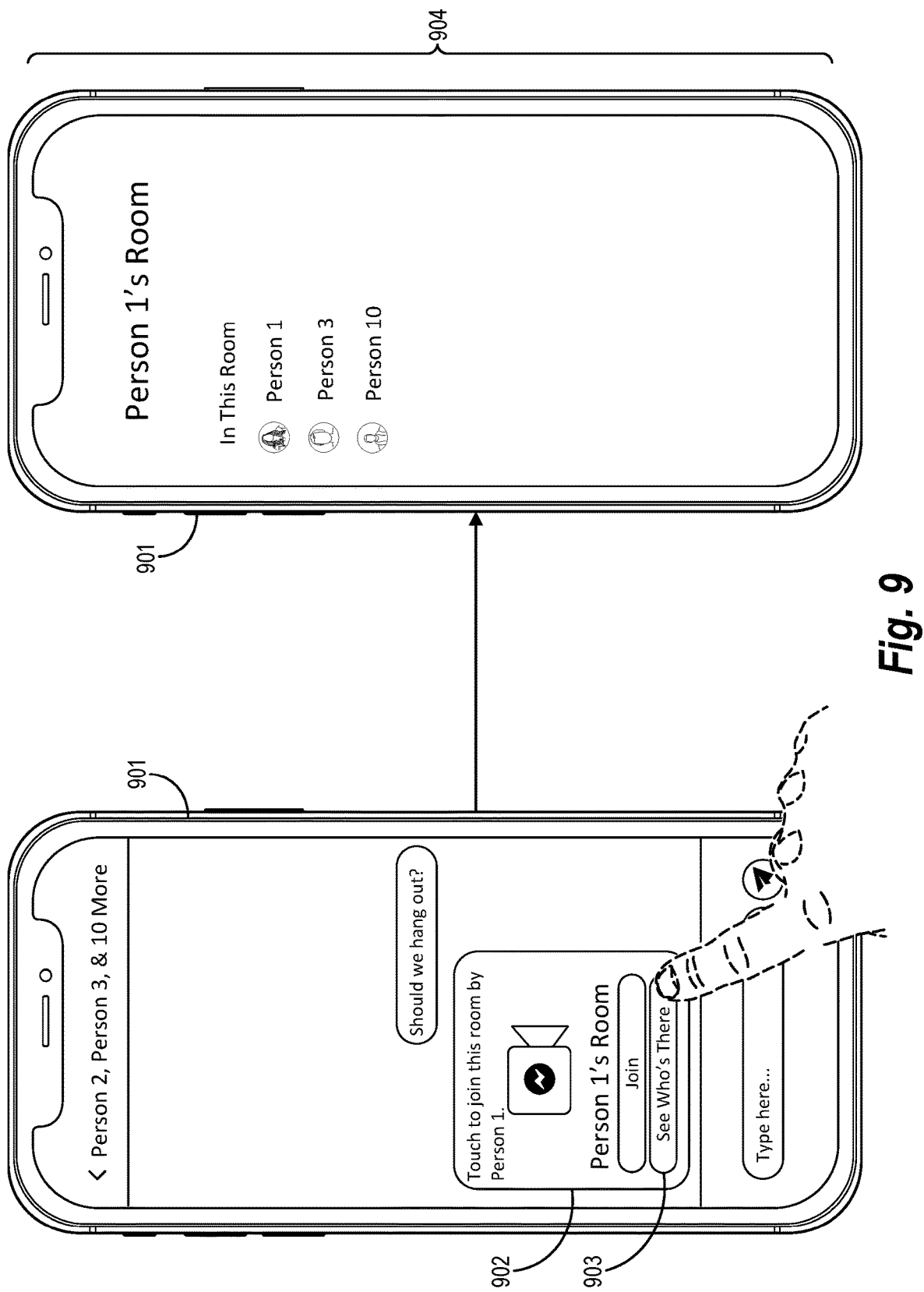
FIG. 9 illustrates a participant device displaying a peephole option for viewing participants in a video room in accordance with one or more embodiments.

In some embodiments, the video room system 102 provides a peephole option that is selectable to view participants within a video room (e.g., the video room 406) without joining or accessing the video room. In particular, the video room system 102 can generate and provide a selectable peephole option together with (e.g., as part of) a shared video room invite. FIG. 9 illustrates the client device 901 displaying a video room invite 902 that includes a peephole option 903 in accordance with one or more embodiments.

As illustrated in FIG. 9, the video room system 102 provides a video room invite 902 shared with a client device 901 (e.g., a client device that has not yet joined and is not yet participating in the video room) by a participant device within the video room 406. Indeed, the video room system 102 provides the video room invite 902 for display within a message thread of the video room application 110. As shown, the video room invite 902 includes a peephole option 903 that is selectable to view participants within the video room 406.

Indeed, based on receiving an indication of user selection of the peephole option 903, the video room system 102 provides the participant interface 904 for display on the client device 901. In addition, the video room system 102 does not add the client device 901 to the video room 406 based on user selection of the peephole option 903. Rather, the video room system 102 provides the participant interface 904 for display to present a visual representation of the participants who are in the video room 406 without adding the client device 901 to the video room 406. In one or more embodiments, the video room system 102 shows the creator device that the client device 901 is viewing who is in the video room 406, but the video room system 102 does not show other participant devices within the video room 406 that the client device 901 is viewing who is in the video room 406.

In some embodiments, the video room system 102 only provides the peephole option 903 to the client device 901 upon determining that the client device 901 has a connection closeness with a creator device (or some other participant device within the video room 406) that satisfies a connection closeness threshold. In these or other embodiments, the video room system 102 only provides the peephole option 903 as part of a shared video room invite (e.g., the video room invite 902) and does not provide a peephole option with a video room option that is surfaced within a social networking feed.

Figure 10:
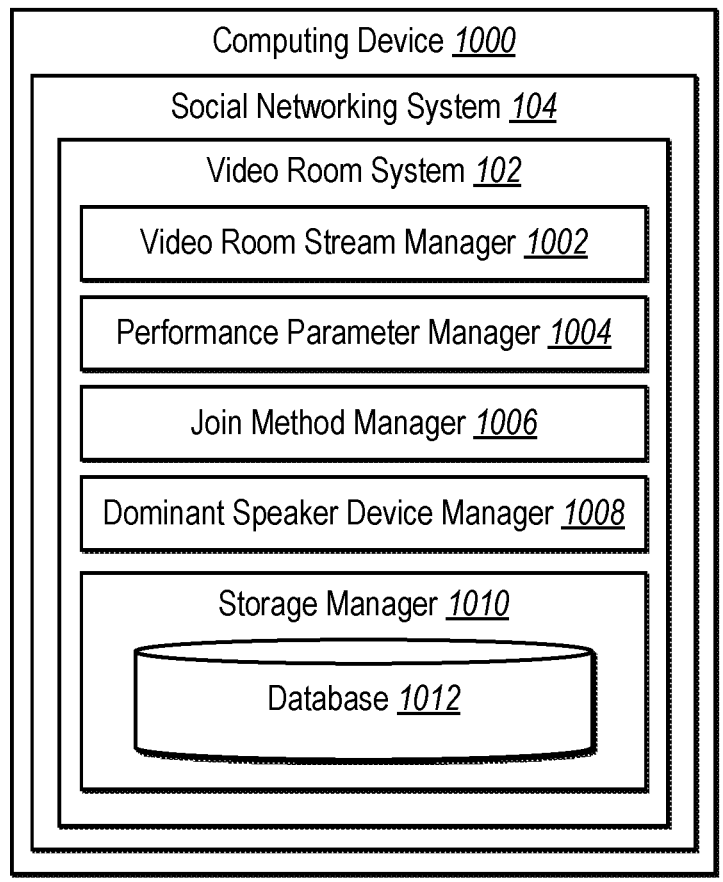
FIG. 10 illustrates an example schematic diagram of a computing device including various components of a video room system in accordance with one or more embodiments.
Figure 11:
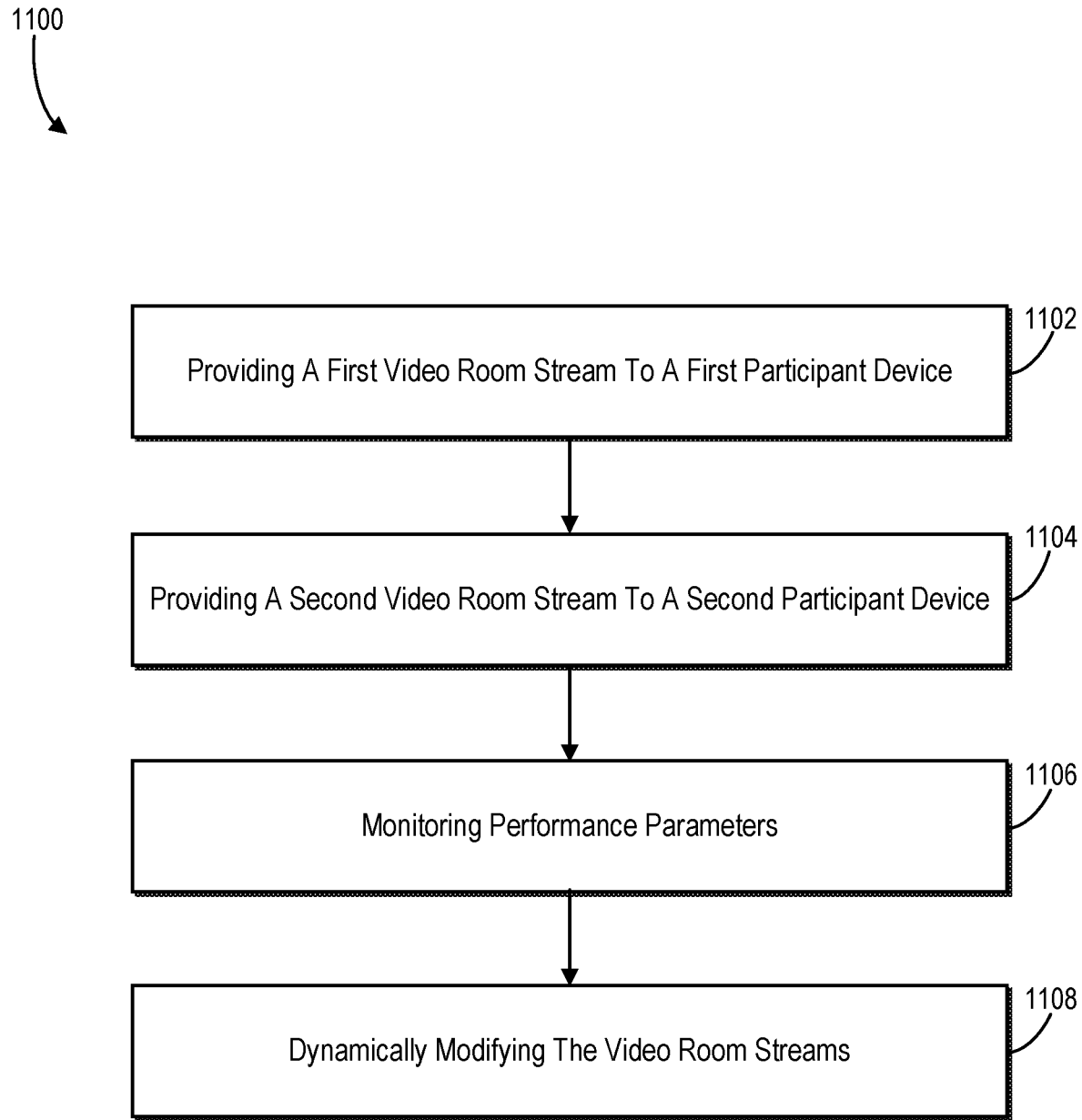
FIG. 11 illustrates an example flow of acts for generating and providing video room streams to participant devices based on performance parameters in accordance with one or more embodiments.

Looking now to FIG. 10, additional detail will be provided regarding components and capabilities of the video room system 102. Specifically, FIG. 10 illustrates an example schematic diagram of the video room system 102 on an example computing device 1000 (e.g., one or more of the participant devices 108*a*-108*n* and/or the server(s) 106). As shown in FIG. 11, the video room system 102 may include a video room stream manager 1002, a performance parameter manager 1004, a join method manager 1006, a dominant speaker device manager 1008, and a storage manager 1010.

As mentioned, the video room system 102 includes video room stream manager 1002. In particular, the video room stream manager 1002 manages, maintains, generates, provides, presents, displays, modifies, or customizes video room streams for participant devices. For example, the video room stream manager 1002 provides a video room stream to a first participant device that includes a first subset of live video streams from participant devices within a video room and provides a video room stream to a second participant device that includes a second subset of live video streams from participant devices within the video room. The video room stream manager 1002 identifies and selects live video streams based on performance parameters, as described herein. In some embodiments, the video room stream manager 1002 identifies and selects live video streams based on connection closeness, join methods, and/or identification of dominant speaker devices.

As shown in FIG. 10, the video room system 102 also includes a performance parameter manager 1004. In particular, the performance parameter manager 1004 manages, maintains, determines, monitors, detects, or identifies performance parameters for participant devices within a video room. For example, the performance parameter manager 1004 determines performance parameters such as processing capacity, bandwidth, screen size, battery life, and access platform, as described herein.

Additionally, the video room system 102 includes a join method manager 1006. In particular, the join method manager 1006 manages, maintains, detects, determines, monitors, or identifies join methods by which participant devices join a video room. For example, the join method manager 1006 determines that a first participant device joins a video room via user selection of a shared video room invite and that a second participant device joins the video room via user selection of a surfaced video room option. In some embodiments, the join method manager 1006 further determines connections and connection closeness between participant devices, as described herein.

As further shown, the video room system 102 includes a dominant speaker device manager 1008. In particular, the dominant speaker device manager 1008 manages, maintains, determines, assigns, detects, or identifies dominant speaker devices within a video room. For example, the dominant speaker device manager 1008 identifies a dominant speaker device based on analyzing audio data received from participant devices within a video room, as described herein.

Further, the video room system 102 includes a storage manager 1010. In particular, the storage manager 1010 manages, maintains, receives, provides, stores, accesses, or identifies various information within the database 1012. For example, the storage manager 1010 stores and provides a URL for a video room, performance parameter information for participant devices, join methods for participant devices, connection information between participant devices, and indications of dominant speaker devices.

In one or more embodiments, each of the components of the video room system 102 are in communication with one another using any suitable communication technologies. Additionally, the components of the video room system 102 can be in communication with one or more other devices including one or more client devices described above. It will be recognized that although the components of the video room system 102 are shown to be separate in FIG. 11, any of the subcomponents may be combined into fewer components, such as into a single component, or divided into more components as may serve a particular implementation. Furthermore, although the components of FIG. 11 are described in connection with the video room system 102, at least some of the components for performing operations in conjunction with the video room system 102 described herein may be implemented on other devices within the environment.

The components of the video room system 102 can include software, hardware, or both. For example, the components of the video room system 102 can include one or more instructions stored on a computer-readable storage medium and executable by processors of one or more computing devices (e.g., the computing device 1000). When executed by the one or more processors, the computer-executable instructions of the video room system 102 can cause the computing device 900 to perform the methods described herein. Alternatively, the components of the video room system 102 can comprise hardware, such as a special purpose processing device to perform a certain function or group of functions. Additionally or alternatively, the components of the video room system 102 can include a combination of computer-executable instructions and hardware.

Furthermore, the components of the video room system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the video room system 102 may be implemented as part of a stand-alone application on a personal computing device or a mobile device. Alternatively or additionally, the components of the video room system 102 may be implemented in any application that allows creation and delivery of marketing content to users, including, but not limited to, various applications.

FIGS. 1-10, the corresponding text, and the examples provide a number of different systems, methods, and non-transitory computer readable media for generating and providing video room streams to participant devices based on performance parameters. In addition to the foregoing, embodiments can also be described in terms of flowcharts comprising acts for accomplishing a particular result. For example, FIG. 11 illustrates a flowchart of an example sequence of acts in accordance with one or more embodiments.

While FIG. 11 illustrates acts according to some embodiments, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 for generating and providing video room streams to participant devices based on performance parameters. The series of acts 1100 includes an act 1102 of providing a first video room stream to a first participant device. In particular, the act 1102 can involve providing, for display on a first participant device from among a plurality of participant devices participating in a video room, a first video room stream comprising a first subset of live video streams from participant devices of the plurality of participant devices.

In addition, the series of acts 1100 includes an act 1104 of providing a second video room stream to a second participant device. In particular, the act 1104 can involve providing, for display on a second participant device from among the plurality of participant devices participating in the video room, a second video room stream comprising a second subset of live video streams from participant devices of the plurality of participant devices.

As shown, the series of acts 1100 includes an act 1106 of monitoring performance parameters. In particular, the act 1106 can involve monitoring performance parameters for the first participant device and the second participant device. For example, the act 1106 involves monitoring two or more of a remaining battery life of the first participant device, a processing capacity of the first participant device, a bandwidth associated with the first participant device, or an access platform utilized by the first participant device to access the video room. In some embodiments, the act 1106 involves monitoring three or more of a remaining battery life of the first participant device, a processing capacity of the first participant device, a bandwidth associated with the first participant device, or an access platform utilized by the first participant device to access the video room.

Further, the series of acts 1100 includes an act 1108 of dynamically modifying the video room streams. In particular, the act 1108 can involve, based on monitoring the performance parameters of the first participant device and second participant device, dynamically modifying the first subset of live video streams from the participant devices to provide for the first video room stream and the second subset of live video streams from the participant devices to provide for the second video room stream. For example, the act 1108 can include determining that the video room includes at least a threshold number of participant devices and dynamically modifying the first subset of live video streams and the second subset of live video streams based on determining that the video room includes at least the threshold number of participant devices. In some embodiments, the act 1108 involves dynamically modifying the first subset of live video streams and the second subset of live video streams by adding an additional video stream to first subset of live video streams based on determining higher performance from the performance parameters for the first participant device and removing a video stream from the second subset of live video streams based on determining lower performance from the performance parameters for the second participant device.

In some embodiments, the series of acts 1100 includes an act of determining a first join method whereby the first participant device joined the video room and a second join method whereby the second participant device joined the video room. The series of acts 1100 can also include an act of dynamically modifying the first subset of live video streams further based on the first join method. For example, the series of acts 1100 can include an act of adding a new live video stream to the first subset of live video streams based on the first join method. Further, the series of acts 1100 can include an act of dynamically modifying the second subset of live video streams further based on the second join method. For instance, the series of acts 1100 can include an act of removing a live video stream from the second subset of live video streams based on the second join method.

The series of acts 1100 can also include an act of identifying a dominant speaker device within the video room by monitoring audio output received from the plurality of participant devices participating in the video room. In addition, the series of acts 1100 can include an act of dynamically modifying the first subset of live video streams and the second subset of live video streams based on identifying the dominant speaker device. For example, the series of acts 1100 can include an act of dynamically modify the first subset of live video streams and the second subset of live video streams to include a live video stream received from the dominant speaker device.

In one or more embodiments, the series of acts 1100 includes an act of determining, from a social graph associated with a social networking system, connections between a first user account associated with the first participant device and other user accounts associated with other participant devices from among the plurality of participant devices participating in the video room. In these or other embodiments, the series of acts 1100 includes an act of dynamically modifying the first subset of live video streams to prioritize live video streams based on closeness of the connections between the first user account associated with the first participant device and other user accounts associated with other participant devices. For example, the series of acts 1100 can include an act of dynamically modifying the first subset of live video streams to prioritize live video streams received from participant devices associated with user accounts that are within a threshold closeness to the first user account associated with the first participant device.

Further, the series of acts 1100 can include an act of assigning, from among the plurality of participant devices within the video room, a moderator device based on trustworthiness ratings associated with the plurality of participant devices. The series of acts 1100 can also include an act of providing moderator controls to the moderator device to moderate the video room.

The series of acts 1100 can include an act of providing, for display on the first participant device together with a video room option, a peephole option selectable to view participants already within the video room without accessing the video room. In addition, the series of acts 1100 can include an act of, in response to receiving an indication of user selection of the peephole option, providing a visual representation of participants already within the video room for display on the first participant device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
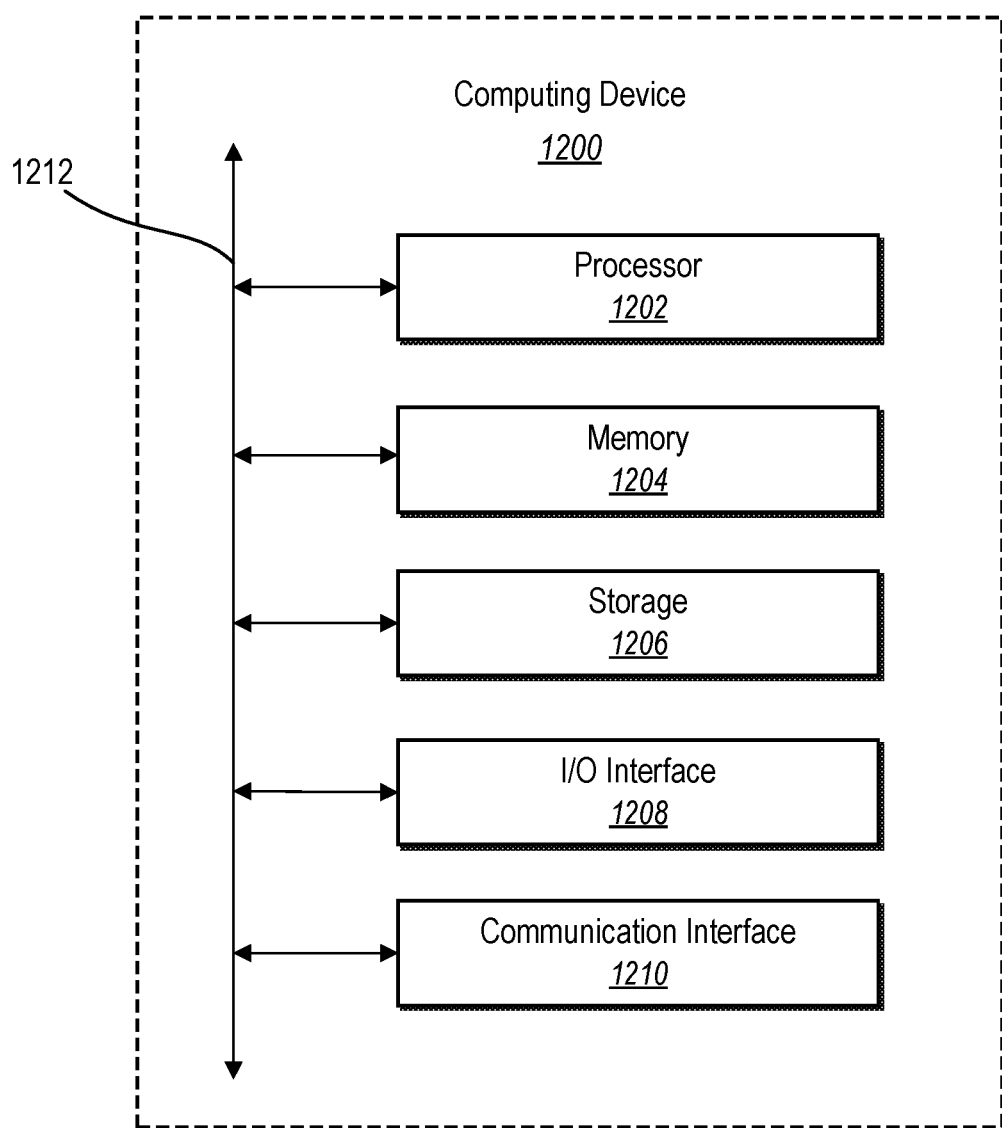
FIG. 12 illustrates a block diagram of an example computing device in accordance with one or more embodiments.

FIG. 12 illustrates a block diagram of an example computing device 1200 (e.g., the server(s) 106 and/or the participant devices 108a-108n) that may be configured to perform one or more of the processes described above. One will appreciate that one or more computing devices such as the computing device 1200 may implement the video room system 102. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. While an example computing device 1200 is shown in FIG. 12, the components illustrated in FIG. 12 are not intended to be limiting. Additional or alternative components may be used in other embodiments. Furthermore, in certain embodiments, the computing device 1200 can include fewer components than those shown in FIG. 12. Components of the computing device 1200 shown in FIG. 12 will now be described in additional detail.

In one or more embodiments, the processor 1202 includes hardware for executing instructions, such as those making up a computer program. For example, to execute instructions, the processor 1202 may retrieve (or fetch) the instructions from an internal register, an internal cache, the memory 1204, or the storage device 1206 and decode and execute them. In one or more embodiments, the processor 1202 may include one or more internal caches for data, instructions, or addresses. For example, the processor 1202 may include one or more instruction caches, one or more data caches, and one or more translation lookaside buffers (TLBs). Instructions in the instruction caches may be copies of instructions in the memory 1204 or the storage device 1206.

The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The storage device 1206 includes storage for storing data or instructions. For example, storage device 1206 can comprise a non-transitory storage medium described above. The storage device 1206 may include a hard disk drive (HDD), a floppy disk drive, flash memory, an optical disc, a magneto-optical disc, magnetic tape, or a Universal Serial Bus (USB) drive or a combination of two or more of these. The storage device 1206 may include removable or non-removable (or fixed) media, where appropriate. The storage device 1206 may be internal or external to the computing device 1200. In one or more embodiments, the storage device 1206 is non-volatile, solid-state memory. In other embodiments, the storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, another known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (e.g., packet-based communication) between the computing device 1200 and one or more other computing devices or networks. For example, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1210 may facilitate communications with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination thereof.

Additionally, the communication interface 1210 may facilitate communications across various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1212 may include hardware, software, or both that connects components of the computing device 1200 to each other. For example, the communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the video room system 102 can operate as a social networking system in various embodiments. In addition to the description given above, a social networking system may enable its users (such as persons or organizations) to interact with the system and with each other. The social networking system may, with input from a user, create and store in the social networking system a social media account associated with the user. The social media account may include demographic information, communication-channel information, and information on personal interests of the user. The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users.

Also, the social networking system may allow users to post photographs and other multimedia content items to a user's profile page (typically known as "wall posts" or "timeline posts") or in a photo album, both of which may be accessible to other users of the social networking system depending upon the user's configured privacy settings.

Figure 13:
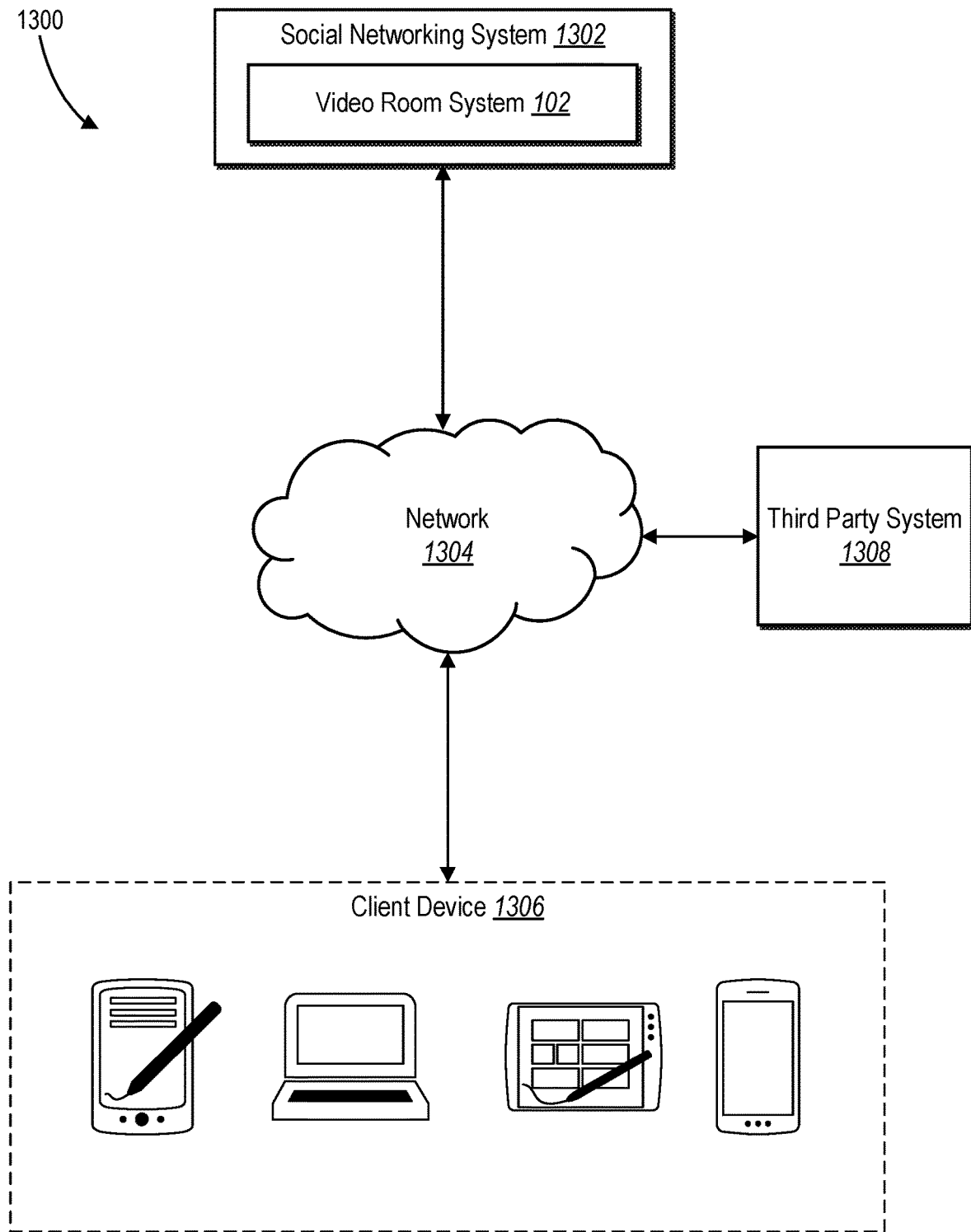
FIG. 13 illustrates an example network environment of a networking system in accordance with one or more embodiments.

FIG. 13 illustrates an example network environment 1300 of a networking system. The network environment 1300 includes a social networking system 1302 (e.g., the social networking system 104), a user device 1306, and a third-party system 1308 connected to each other by a network 1304. Although FIG. 13 illustrates a particular arrangement of the social networking system 1302, the user device 1306, the third-party system 1308, and the network 1304, this disclosure contemplates any suitable arrangement of the devices, systems, and networks. For example, the user device 1306 and the social networking system 1302 may be physically or logically co-located with each other in whole, or in part. Moreover, although FIG. 13 illustrates a single user device 1306, the social networking system 1302, the third-party system 1308, and the network 1304, this disclosure contemplates any suitable number of devices, systems, and networks.

This disclosure contemplates any suitable network. For example, one or more portions of the network 1304 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1304 may include one or more networks.

Links may connect the social networking system 1302, the user device 1306, and the third-party system 1308 to the network 1304 or to each other. In particular embodiments, one or more links include one or more wireline (e.g., Digital Subscriber Line (DSL) or Data Over Cable Service Interface Specification (DOC SIS)), wireless (e.g., Wi-Fi or Worldwide Interoperability for Microwave Access (WiMAX)), or optical (e.g., Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1300. One or more first links may differ in one or more respects from one or more second links.

In particular embodiments, the user device 1306 may be an electronic device including hardware, software, or embedded logic components or a combination of two or more such components and capable of carrying out the appropriate functionalities implemented or supported by the user device 1306. For example, the user device 1306 may include any of the computing devices discussed above in relation to FIG. 12. The user device 1306 may enable a network user to access the network 1304. The user device 1306 may enable its user to communicate with other users associated with other user devices.

In particular embodiments, the user device 1306 may include a web browser and may have one or more add-ons, plug-ins, or other extensions (e.g., toolbars). A user at the user device 1306 may enter a Uniform Resource Locator (URL) or other address directing the web browser to a particular server (such as server, or a server associated with the third-party system 1308), and the web browser may generate a Hypertext Transfer Protocol (HTTP) request and communicate the HTTP request to server. The server may accept the HTTP request and communicate to the user device 1306 one or more Hypertext Markup Language (HTML) files responsive to the HTTP request.

The user device 1306 may render a webpage based on the HTML files from the server for presentation to the user. For example, webpages may render from HTML files, Extensible Hypertext Markup Language (XHTML) files, or Extensible Markup Language (XML) files, according to particular needs. Such pages may also execute scripts such as those written in JAVASCRIPT, JAVA, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the social networking system 1302 may be a network-addressable computing system that can host an online network of users (e.g., a social networking system or an electronic messaging system). In some embodiments, such as the illustrated embodiment, the social networking system 1302 implements the video room system 102.

The social networking system 1302 may generate, store, receive, and send networking data, such as user-profile data, concept-profile data, graph information (e.g., social-graph information), or other suitable data related to the online network of users. The social networking system 1302 may be accessed by the other components of network environment 1300 either directly or via the network 1304. In particular embodiments, the social networking system 1302 may include one or more servers. Each server may be a unitary server or a distributed server spanning multiple computers or multiple datacenters. Servers may be of various types, such as web server, news server, mail server, message server, advertising server, file server, application server, exchange server, database server, proxy server, another server suitable for performing functions or processes described herein, or any combination thereof.

In one or more embodiments, each server may include hardware, software, or embedded logic components or a combination of two or more such components for carrying out the appropriate functionalities implemented or supported by a server. In particular embodiments, the social networking system 1302 may include one or more data stores. Data stores may be used to store various types of information. In particular embodiments, the information stored in data stores may be organized according to specific data structures. In particular embodiments, each data store may be a relational, columnar, correlation, or another suitable database. Although this disclosure describes or illustrates particular types of databases, this disclosure contemplates any suitable types of databases. Particular embodiments may provide interfaces that enable the social networking system 1302, the user device 1306, or the third-party system 1308 to manage, retrieve, modify, add, or delete, the information stored in a data store.

In particular embodiments, the social networking system 1302 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. The social networking system 1302 may provide users of the online network of users the ability to communicate and interact with other users. In particular embodiments, users may join the online network of users via the social networking system 1302 and then add connections (e.g., relationships) to a number of other users of the social networking system 1302 whom they want to be connected to. Herein, the term "friend" may refer to any other user of the social networking system 1302 with whom a user has formed a connection, association, or relationship via the social networking system 1302.

In particular embodiments, the social networking system 1302 may provide users with the ability to take actions on various types of items or objects, supported by the social networking system 1302. For example, the items and objects may include groups or social networks to which users of the social networking system 1302 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social networking system 1302 or by an external system of the third-party system 1308, which is separate from the social networking system 1302 and coupled to the social networking system 1302 via the network 1304.

In particular embodiments, the social networking system 1302 may be capable of linking a variety of entities. For example, the social networking system 1302 may enable users to interact with each other as well as receive content from the third-party systems 1308 or other entities, or to allow users to interact with these entities through an application programming interfaces (API) or other communication channels.

In particular embodiments, the third-party system 1308 may include one or more types of servers, one or more data stores, one or more interfaces, including but not limited to APIs, one or more web services, one or more content sources, one or more networks, or any other suitable components, e.g., that servers may communicate with. The third-party system 1308 may be operated by a different entity from an entity operating the social networking system 1302. In particular embodiments, however, the social networking system 1302 and the third-party systems 1308 may operate in conjunction with each other to provide social networking services to users of the social networking system 1302 or the third-party systems 1308. In this sense, the social networking system 1302 may provide a platform, or backbone, which other systems, such as the third-party systems 1308, may use to provide social networking services and functionality to users across the Internet.

In particular embodiments, the third-party system 1308 may include a third-party content object provider. A third-party content object provider may include one or more sources of content objects, which may be communicated to a user device 1306. For example, content objects may include information regarding things or activities of interest to the user, such as movie showtimes, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social networking system 1302 also includes user-generated content objects, which may enhance a user's interactions with the social networking system 1302. User-generated content may include anything a user can add, upload, send, or "post" to the social networking system 1302. For example, a user communicates posts to the social networking system 1302 from a user device 1306. Posts may include data such as status updates or other textual data, location information, photos, videos, links, music or other similar data or media. Content may also be added to the social networking system 1302 by a third-party through a "communication channel," such as a newsfeed or stream.

In particular embodiments, the social networking system 1302 may include a variety of servers, sub-systems, programs, modules, logs, and data stores. In particular embodiments, the social networking system 1302 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social networking system 1302 may also include suitable components such as network interfaces, security mechanisms, load balancers, failover servers, management-and-network-operations consoles, other suitable components, or any suitable combination thereof. In particular embodiments, the social networking system 1302 may include one or more user-profile stores for storing social media accounts.

A social media account may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. For example, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes.

The connection information may also include user-defined connections between different users and content (both internal and external). A web server may be used for linking the social networking system 1302 to one or more user device 1306 or one or more the third-party system 1308 via the network 1304. The web server may include a mail server or other messaging functionality for receiving and routing messages between the social networking system 1302 and one or more user device 1306. An API-request server may allow the third-party system 1308 to access information from the social networking system 1302 by calling one or more APIs. An action logger may be used to receive communications from a web server about a user's actions on or off social networking system 1302. In conjunction with the action log, a third-party-content-object log may be maintained of user exposures to third-party-content objects. A notification controller may provide information regarding content objects to a user device 1306.

Information may be pushed to a user device 1306 as notifications, or information may be pulled from user device 1306 responsive to a request received from user device 1306. Authorization servers may be used to enforce one or more privacy settings of the users of the social networking system 1302. A privacy setting of a user determines how particular information associated with a user can be shared. The authorization server may allow users to opt in to or opt out of having their actions logged by the social networking system 1302 or shared with other systems (e.g., the third-party system 1308), such as by setting appropriate privacy settings. Third-party-content-object stores may be used to store content objects received from third parties, such as the third-party system 1308. Location stores may be used for storing location information received from user device 1306 associated with users. Advertisement-pricing modules may combine social information, the current time, location information, or other suitable information to provide relevant advertisements, in the form of notifications, to a user.

Figure 14:
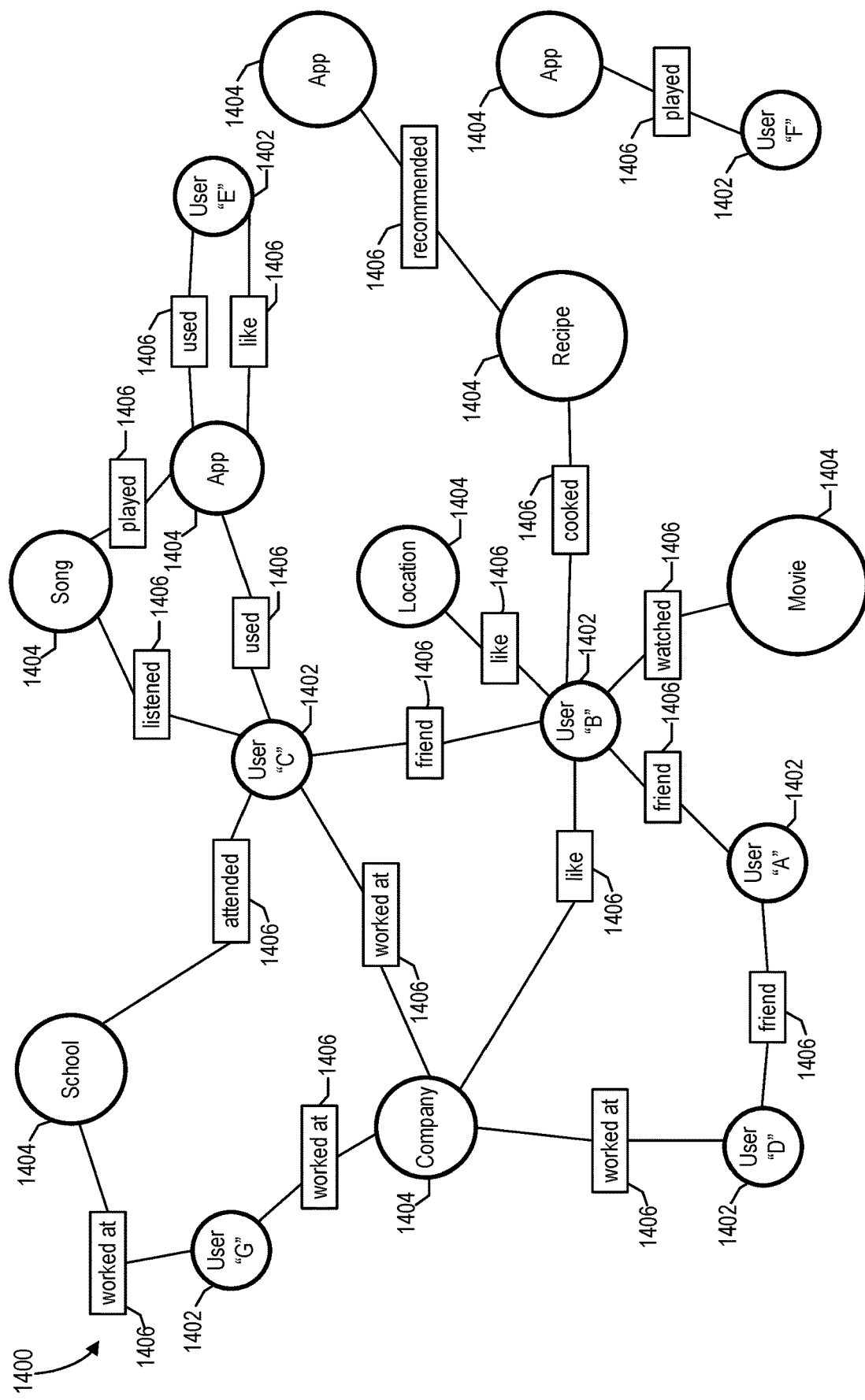
FIG. 14 illustrates a social graph in accordance with one or more embodiments.

FIG. 14 illustrates example social graph 1400. In particular embodiments, the social networking system 1302 may store one or more social graphs 1400 in one or more data stores. In particular embodiments, social graph 1400 may include multiple nodes—which may include multiple user nodes 1402 or multiple concept nodes 1404—and multiple edges 1406 connecting the nodes. Example social graph 1400 illustrated in FIG. 14 is shown, for didactic purposes, in a two-dimensional visual map representation. In particular embodiments, the social networking system 1302, the user device 1306, or the third-party system 1308 may access social graph 1400 and related social-graph information for suitable applications. The nodes and edges of social graph 1400 may be stored as data objects, for example, in a data store (such as a social-graph database). Such a data store may include one or more searchable or quarriable indexes of nodes or edges of social graph 1400.

In particular embodiments, a user node 1402 may correspond to a user of the social networking system 1302. For example, a user may be an individual (human user), an entity (e.g., an enterprise, business, or third-party application), or a group (e.g., of individuals or entities) that interacts or communicates with or over social networking system 1302. In particular embodiments, when a user registers for an account with the social networking system 1302, the social networking system 1302 may create a user node 1402 corresponding to the user and store the user node 1402 in one or more data stores. Users and user nodes 1402 described herein may, where appropriate, refer to registered users and user nodes 1402 associated with registered users.

In addition, or as an alternative, users and user nodes 1402 described herein may, where appropriate, refer to users that have not registered with the social networking system 1302. In particular embodiments, a user node 1402 may be associated with information provided by a user or information gathered by various systems, including the social networking system 1302. For example, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1404 may correspond to a concept. For example, a concept may correspond to a place (e.g., a movie theater, restaurant, landmark, or city); a website (e.g., a website associated with social networking system 1302 or a third-party website associated with a web-application server); an entity (e.g., a person, business, group, sports team, or celebrity); a resource (e.g., an audio file, video file, digital photo, text file, structured document, or application) which may be located within the social networking system 1302 or on an external server, such as a web-application server; real or intellectual property (e.g., a sculpture, painting, movie, game, song, idea, photograph, or written work); a game; an activity; an idea or theory; another suitable concept; or two or more such concepts. A concept node 1404 may be associated with information of a concept provided by a user or information gathered by various systems, including the social networking system 1302. For example, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1404 may be associated with one or more data objects corresponding to information associated with concept node 1404. In particular embodiments, a concept node 1404 may correspond to one or more webpages.

In particular embodiments, a node in the social graph 1400 may represent or be represented by a webpage (which may be referred to as a "profile page"). Profile pages may be hosted by or accessible to the social networking system 1302. Profile pages may also be hosted on third-party websites associated with a third-party system 1308. For example, a profile page corresponding to a particular external webpage may be the particular external webpage, and the profile page may correspond to a particular concept node 1404. Profile pages may be viewable by all or a selected subset of other users. For example, a user node 1402 may have a corresponding user-profile page in which the corresponding user may add content, make declarations, or otherwise express himself or herself. As another example and not by way of limitation, a concept node 1404 may have a corresponding concept-profile page in which one or more users may add content, make declarations, or express themselves, particularly in relation to the concept corresponding to concept node 1404.

In particular embodiments, a concept node 1404 may represent a third-party webpage or resource hosted by the third-party system 1308. The third-party webpage or resource may include, among other elements, content, a selectable or another icon, or another inter-actable object (which may be implemented, for example, in JavaScript, AJAX, or PHP codes) representing an action or activity. For example, a third-party webpage may include a selectable icon such as "like," "check-in," "eat," "recommend," or another suitable action or activity. A user viewing the third-party webpage may perform an action by selecting one of the icons (e.g., "eat"), causing a user device 1306 to send to the social networking system 1302 a message indicating the user's action. In response to the message, the social networking system 1302 may create an edge (e.g., an "eat" edge) between a user node 1402 corresponding to the user and a concept node 1404 corresponding to the third-party webpage or resource and store edge 1406 in one or more data stores.

In particular embodiments, a pair of nodes in the social graph 1400 may be connected to each other by one or more edges 1406. An edge 1406 connecting a pair of nodes may represent a relationship between the pair of nodes. In particular embodiments, an edge 1406 may include or represent one or more data objects or attributes corresponding to the relationship between a pair of nodes. For example, a first user may indicate that a second user is a "friend" of the first user. In response to this indication, the social networking system 1302 may send a "friend request" to the second user. If the second user confirms the "friend request," social networking system 1302 may create an edge 1406 connecting the first user's user node 1402 to the second user's user node 1402 in the social graph 1400 and store edge 1406 as social-graph information in one or more of data stores. In the example of FIG. 14, social graph 1400 includes an edge 1406 indicating a friend relation between user nodes 1402 of user "A" and user "B" and an edge indicating a friend relation between user nodes 1402 of user "C" and user "B." Although this disclosure describes or illustrates particular edges 1406 with particular attributes connecting particular user nodes 1402, this disclosure contemplates any suitable edges 1406 with any suitable attributes connecting user nodes 1402. For example, an edge 1406 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 1400 by one or more edges 1406.

In particular embodiments, an edge 1406 between a user node 1402 and a concept node 1404 may represent a particular action or activity performed by a user associated with user node 1402 toward a concept associated with a concept node 1404. For example, as illustrated in FIG. 14, a user may "like," "attended," "played," "listened," "cooked," "worked at," or "watched" a concept, each of which may correspond to an edge type or subtype. A concept-profile page corresponding to a concept node 1404 may include, for example, a selectable "check-in" icon (e.g., a clickable "check-in" icon) or a selectable "add to favorites" icon. Similarly, after a user clicks these icons, the social networking system 1302 may create a "favorite" edge or a "check-in" edge in response to a user's action corresponding to a respective action.

As another example and not by way of limitation, a user (user "C") may listen to a particular song using a particular application (e.g., an online music application). In this case, the social networking system 1302 may create a "listened" edge 1406 and a "used" edge (as illustrated in FIG. 14) between user nodes 1402 corresponding to the user and concept nodes 1404 corresponding to the song and application to indicate that the user listened to the song and used the application.

Moreover, the social networking system 1302 may create a "played" edge 1406 (as illustrated in FIG. 14) between concept nodes 1404 corresponding to the song and the application to indicate that the particular song was played by the particular application. In this case, "played" edge 1406 corresponds to an action performed by an external application on an external audio file. Although this disclosure describes particular edges 1406 with particular attributes connecting user nodes 1402 and concept nodes 1404, this disclosure contemplates any suitable edges 1406 with any suitable attributes connecting user nodes 1402 and concept nodes 1404.

Furthermore, although this disclosure describes edges between a user node 1402 and a concept node 1404 representing a single relationship, this disclosure contemplates edges between a user node 1402 and a concept node 1404 representing one or more relationships. For example, an edge 1406 may represent both that a user likes and has used at a particular concept. Alternatively, another edge 1406 may represent each type of relationship (or multiples of a single relationship) between a user node 1402 and a concept node 1404 (as illustrated in FIG. 14 between user node 1402 for user "E" and concept node 1404).

In particular embodiments, the social networking system 1302 may create an edge 1406 between a user node 1402 and a concept node 1404 in the social graph 1400. For example, a user viewing a concept-profile page (e.g., by using a web browser or a special-purpose application hosted by the user's user device 1306) may indicate that he or she likes the concept represented by the concept node 1404 by clicking or selecting a "Like" icon, which may cause the user's user device 1306 to send to the social networking system 1302 a message indicating the user's liking of the concept associated with the concept-profile page.

In response to the message, the social networking system 1302 may create an edge 1406 between user node 1402 associated with the user and concept node 1404, as illustrated by "like" edge 1406 between the user and concept node 1404. In particular embodiments, the social networking system 1302 may store an edge 1406 in one or more data stores. In particular embodiments, an edge 1406 may be automatically formed by the social networking system 1302 in response to a particular user action. For example, if a first user uploads a picture, watches a movie, or listens to a song, an edge 1406 may be formed between user node 1402 corresponding to the first user and concept nodes 1404 corresponding to those concepts. Although this disclosure describes forming particular edges 1406 in particular manners, this disclosure contemplates forming any suitable edges 1406 in any suitable manner.

In particular embodiments, an advertisement may be text (which may be HTML-linked), one or more images (which may be HTML-linked), one or more videos, audio, one or more other types of files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on the social networking system 1302)

A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a predetermined area of a profile page of a user or other page, presented with additional information associated with the advertiser, bumped up or otherwise highlighted within news feeds or tickers of other users, or otherwise promoted. The advertiser may pay to have the social action promoted. For example, advertisements may be included among the search results of a search-results page, where sponsored content is promoted over non-sponsored content.

In particular embodiments, an advertisement may be requested for display within social networking system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. For example, the user may view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social networking system 1302 may execute or modify a particular action of the user.

An advertisement may also include social networking-system functionality that a user may interact with. For example, an advertisement may enable a user to "like" or otherwise endorse the advertisement by selecting an icon or link associated with the endorsement. As another example and not by way of limitation, an advertisement may enable a user to search (e.g., by executing a query) for content related to the advertiser. Similarly, a user may share the advertisement with another user (e.g., through the social networking system 1302) or RSVP (e.g., through the social networking system 1302) to an event associated with the advertisement. In addition, or as an alternative, an advertisement may include a social networking system context directed to the user. For example, an advertisement may display information about a friend of the user within the social networking system 1302 who has taken an action associated with the subject matter of the advertisement.

In particular embodiments, the social networking system 1302 may determine the social-graph affinity (which may be referred to herein as "affinity") of various social-graph entities for each other. Affinity may represent the strength of a relationship or level of interest between particular objects associated with the online network of users, such as users, concepts, content, actions, advertisements, other objects associated with the online network of users, or any suitable combination thereof. Affinity may also be determined with respect to objects associated with the third-party systems 1308 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social networking system 1302 may measure or quantify social-graph affinity using an affinity coefficient (which may be referred to herein as "coefficient"). The coefficient may represent or quantify the strength of a relationship between particular objects associated with the online network of users. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online network of users. For example, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social networking system 1302 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static, or the weights may change according to, for example, the user, the type of relationship, the type of action, the user's location, and so forth. Ratings for the factors may be combined according to their weights to determine an overall coefficient for the user. For example, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 1302 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. For example, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social networking system 1302 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social networking system 1302 may calculate a coefficient based on a user's actions. The social networking system 1302 may monitor such actions on the online network of users, on the third-party system 1308, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, the social networking system 1302 may calculate a coefficient based on the user's actions with particular types of content. The content may be associated with the online network of users, the third-party system 1308, or another suitable system. The content may include users, profile pages, posts, news stories, headlines, instant messages, chat room conversations, emails, advertisements, pictures, video, music, other suitable objects, or any combination thereof. The social networking system 1302 may analyze a user's actions to determine whether one or more of the actions indicate an affinity for the subject matter, content, other users, and so forth. For example, if a user may make frequently posts content related to "coffee" or variants thereof, the social networking system 1302 may determine the user has a high coefficient with respect to the concept "coffee." Particular actions or types of actions may be assigned a higher weight and/or rating than other actions, which may affect the overall calculated coefficient. For example, if a first user emails a second user, the weight or the rating for the action may be higher than if the first user views the user-profile page for the second user.

In particular embodiments, the social networking system 1302 may calculate a coefficient based on the type of relationship between particular objects. Referencing the social graph 1400, the social networking system 1302 may analyze the number and/or type of edges 1406 connecting particular user nodes 1402 and concept nodes 1404 when calculating a coefficient. For example, user nodes 1402 that are connected by a spouse-type edge (representing that the two users are married) may be assigned a higher coefficient than a user nodes 1402 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. For example, if a user is tagged in a first photo, but merely likes a second photo, the social networking system 1302 may determine that the user has a higher coefficient with respect to the first photo than the second photo because having a tagged-in-type relationship with content may be assigned a higher weight and/or rating than having a like-type relationship with content.

In some embodiments, the social networking system 1302 may calculate a coefficient for a first user based on the relationship one or more second users have with a particular object. In other words, the connections and coefficients other users have with an object may affect the first user's coefficient for the object. For example, if a first user is connected to or has a high coefficient for one or more second users, and those second users are connected to or have a high coefficient for a particular object, the social networking system 1302 may determine that the first user should also have a relatively high coefficient for the particular object. In one or more embodiments, the coefficient may be based on the degree of separation between particular objects. The degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends."

Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1400. For example, social-graph entities that are closer in the social graph 1400 (i.e., fewer degrees of separation) may have a higher coefficient than entities that are further apart in the social graph 1400.

In particular embodiments, the social networking system 1302 may calculate a coefficient based on location information. Objects that are geographically closer to each other may be considered to be more related, or of more interest, to each other than more distant objects. In some embodiments, the coefficient of a user towards a particular object may be based on the proximity of the object's location to a current location associated with the user (or the location of a user device 1306 of the user). A first user may be more interested in other users or concepts that are closer to the first user. For example, if a user is one mile from an airport and two miles from a gas station, the social networking system 1302 may determine that the user has a higher coefficient for the airport than the gas station based on the proximity of the airport to the user.

In particular embodiments, the social networking system 1302 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social networking system 1302 may provide information that is relevant to a user's interests and current circumstances, increasing the likelihood that they will find such information of interest.

In some embodiments, the social networking system 1302 may generate content based on coefficient information. Content objects may be provided or selected based on coefficients specific to a user. For example, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object.

In one or more embodiments, the social networking system 1302 may generate search results based on coefficient information. The search results for a particular user may be scored or ranked based on the coefficient associated with the search results with respect to the querying user. For example, search results corresponding to objects with higher coefficients may be ranked higher on a search-results page than results corresponding to objects having lower coefficients.

In particular embodiments, the social networking system 1302 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online network of users, from the third-party system 1308 (e.g., via an API or another communication channel), or from another suitable system. In response to the request, the social networking system 1302 may calculate the coefficient (or access the coefficient information if it has previously been calculated and stored).

In various embodiments, the social networking system 1302 may measure an affinity with respect to a particular process. Different processes (both internal and external to the online network of users) may request a coefficient for a particular object or set of objects. The social networking system 1302 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 11, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, filed Oct. 1, 2012, each of which is incorporated by reference in their entirety.

In particular embodiments, one or more of the content objects of the online network of users may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online network of users. Where the privacy settings for an object allow a particular user to access that object, the object may be described as being "visible" with respect to that user. For example, a user of the online network of users may specify privacy settings for a user-profile page identify a set of users that may access the work experience information on the user-profile page, thus excluding other users from accessing the information.

In particular embodiments, the privacy settings may specify a "blocked list" of users that should not be allowed to access certain information associated with the object. In other words, the blocked list may specify one or more users or entities for which an object is not visible. For example, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online network of users. For example, a particular concept node 1404 corresponding to a particular photo may have a privacy setting specifying that the photo may only be accessed by users tagged in the photo and their friends.

In particular embodiments, privacy settings may allow users to opt in or opt out of having their actions logged by the social networking system 1302 or shared with other systems (e.g., the third-party system 1308). In particular embodiments, the privacy settings associated with an object may specify any suitable granularity of permitted access or denial of access. For example, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of the third-party systems 1308, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, the social networking system 1302 may send a request to the data store for the object. The request may identify the user associated with the request and may only be sent to the user (or a user device 1306 of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user.

In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   determining, by at least one processor, a first join method by which a first participant device from among a plurality of participant devices joins in a video room and a second join method by which a second participant device from among the plurality of participant devices joins the video room;
   providing, for display on the first participant device and by the at least one processor, a first video room stream comprising a first number of live video streams from participant devices of the plurality of participant devices based on the first join method; and
   providing, for display on the second participant device and by the at least one processor, a second video room stream comprising a second number of live video streams from participant devices of the plurality of participant devices based on the second join method.

2. The computer-implemented method of claim 1, wherein:
   determining the first join method comprises determining that the first participant device joins the video room via selection of a shared video room invite; and
   determining the second join method comprises determining that the second participant device joins the video room via selection of a surfaced video room option from a social networking feed.

3. The computer-implemented method of claim 1, wherein providing the second video room stream comprises providing fewer live video streams to the second participant device than to the first participant device based on a difference between the first join method and the second join method.

4. The computer-implemented method of claim 1, further comprising prioritizing, for providing to the plurality of participant devices participating in the video room and based on comparing the first join method with the second join method, a live video stream received from the first participant device over a live video stream received from the second participant device.

5. The computer-implemented method of claim 1, further comprising determining a first trustworthiness rating for the first participant device based on the first join method and a second trustworthiness rating for the second participant device based on the second join method.

6. The computer-implemented method of claim 5, wherein providing the first video room stream to the first participant device is based on the first trustworthiness rating and providing the second video room stream to the second participant device is based on the second trustworthiness rating.

7. The computer-implemented method of claim 1, further comprising determining join methods for each of the plurality of participant devices participating in the video room, wherein the join methods each comprise one of a selection of a shared video room invite provided via email, a selection of a shared video room invite provided via text message, or a selection of a surfaced video room option from a social networking feed.

8. A non-transitory computer readable medium comprising instructions that, when executed by at least one processor, cause a computing device to:
   determine a first join method by which a first participant device from among a plurality of participant devices joins in a video room and a second join method by which a second participant device from among the plurality of participant devices joins the video room;
   provide, for display on the first participant device, a first video room stream comprising a first number of live video streams from participant devices of the plurality of participant devices based on the first join method; and
   provide, for display on the second participant device, a second video room stream comprising a second number of live video streams from participant devices of the plurality of participant devices based on the second join method.

9. The non-transitory computer readable medium of claim 8, further comprising instructions that, when executed by the at least one processor, cause the computing device to:
   determine the first join method by determining that the first participant device joins the video room via selection of a shared video room invite; and
   determine the second join method by determining that the second participant device joins the video room via selection of a surfaced video room option from a social networking feed.

10. The non-transitory computer readable medium of claim 8, further comprising instructions that, when executed by the at least one processor, cause the computing device to provide the second video room stream by providing fewer live video streams to the second participant device than to the first participant device based on a difference between the first join method and the second join method.

11. The non-transitory computer readable medium of claim 8, further comprising instructions that, when executed by the at least one processor, cause the computing device to prioritize, for providing to the plurality of participant devices participating in the video room and based on comparing the first join method with the second join method, a live video stream received from the first participant device over a live video stream received from the second participant device.

12. The non-transitory computer readable medium of claim 8, further comprising instructions that, when executed by the at least one processor, cause the computing device to determine a first trustworthiness rating for the first participant device based on the first join method and a second trustworthiness rating for the second participant device based on the second join method.

13. The non-transitory computer readable medium of claim 12, further comprising instructions that, when executed by the at least one processor, cause the computing device to provide the first video room stream to the first participant device based on the first trustworthiness rating and providing the second video room stream to the second participant device based on the second trustworthiness rating.

14. The non-transitory computer readable medium of claim 8, further comprising instructions that, when executed by the at least one processor, cause the computing device to determine join methods for each of the plurality of participant devices participating in the video room, wherein the join methods each comprise one of a selection of a shared video room invite provided via email, a selection of a shared video room invite provided via text message, or a selection of a surfaced video room option from a social networking feed.

15. A system comprising:
   at least one processor; and
   a non-transitory computer readable medium comprising instructions that, when executed by the at least one processor, cause the system to:
      determine a first join method by which a first participant device from among a plurality of participant devices joins in a video room and a second join method by which a second participant device from among the plurality of participant devices joins the video room;
      provide, for display on the first participant device, a first video room stream comprising a first number of live video streams from participant devices of the plurality of participant devices based on the first join method; and
      provide, for display on the second participant device, a second video room stream comprising a second number of live video streams from participant devices of the plurality of participant devices based on the second join method.

16. The system of claim 15, further comprising instructions that, when executed by the at least one processor, cause the system to:
   determine the first join method by determining that the first participant device joins the video room via selection of a shared video room invite; and
   determine the second join method by determining that the second participant device joins the video room via selection of a surfaced video room option from a social networking feed.

17. The system of claim 15, further comprising instructions that, when executed by the at least one processor, cause the system to provide the second video room stream by providing fewer live video streams to the second participant device than to the first participant device based on a difference between the first join method and the second join method.

18. The system of claim 15, further comprising instructions that, when executed by the at least one processor, cause the system to prioritize, for providing to the plurality of participant devices participating in the video room and based on comparing the first join method with the second join method, a live video stream received from the first participant device over a live video stream received from the second participant device.

19. The system of claim 15, further comprising instructions that, when executed by the at least one processor, cause the system to determine a first trustworthiness rating for the first participant device based on the first join method and a second trustworthiness rating for the second participant device based on the second join method.

20. The system of claim 19, further comprising instructions that, when executed by the at least one processor, cause the system to provide the first video room stream to the first participant device based on the first trustworthiness rating and providing the second video room stream to the second participant device based on the second trustworthiness rating.

* * * * *